United States Patent [19]
Sugawara et al.

[11] Patent Number: 5,600,490
[45] Date of Patent: Feb. 4, 1997

[54] ZOOM LENS FOR PROJECTING VIDEO IMAGE

[75] Inventors: Saburo Sugawara; Hiroyuki Hamano, both of Kanagawa-ken, Japan

[73] Assignee: Canon Kabushiki Kaisha, Tokyo, Japan

[21] Appl. No.: 317,523

[22] Filed: Oct. 4, 1994

[30] Foreign Application Priority Data

Oct. 6, 1993 [JP] Japan ................................. 5-250637
Oct. 25, 1993 [JP] Japan ................................. 5-266352

[51] Int. Cl.$^6$ ................................................. G02B 15/14
[52] U.S. Cl. ............................................ 359/690; 359/687
[58] Field of Search ................................ 359/690, 687

[56] References Cited

U.S. PATENT DOCUMENTS 5,257,134  10/1993  Sugawara .............................. 359/690
5,268,793  12/1993  Saka et al. ............................ 359/690
5,311,361   5/1994  Nozawa ................................ 359/690

FOREIGN PATENT DOCUMENTS 527174  2/1993  Japan .

Primary Examiner—Scott J. Sugarman
Attorney, Agent, or Firm—Fitzpatrick, Cella, Harper & Scinto

[57] ABSTRACT

A zoom lens comprising, in order from the large conjugate side, a first lens unit of positive refractive power, a second lens unit of negative refractive power and a third lens unit of positive refractive power, wherein when zooming from the shortest focal length to the longest focal length end, the air separations between the first and second lens units and between the second and third lens units increases and decreases monotonously, respectively, the first to third lens units each has at least one aspheric surface, and the following condition is satisfied:

$$|D_{12d}/D_{23d}|<0.25$$

where $D_{12d}$ is the amount of variation of the separation between the first and second lens units with zooming, and $D_{23d}$ is the amount of variation of the separation between the second and third lens units with zooming.

29 Claims, 16 Drawing Sheets

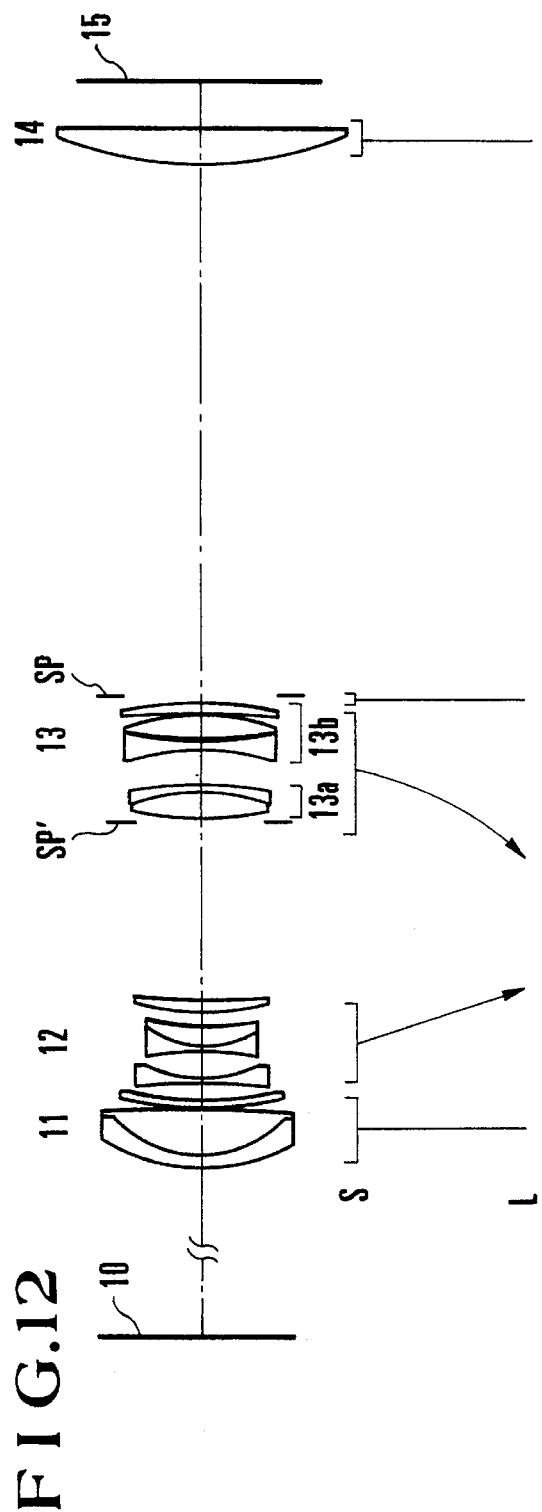
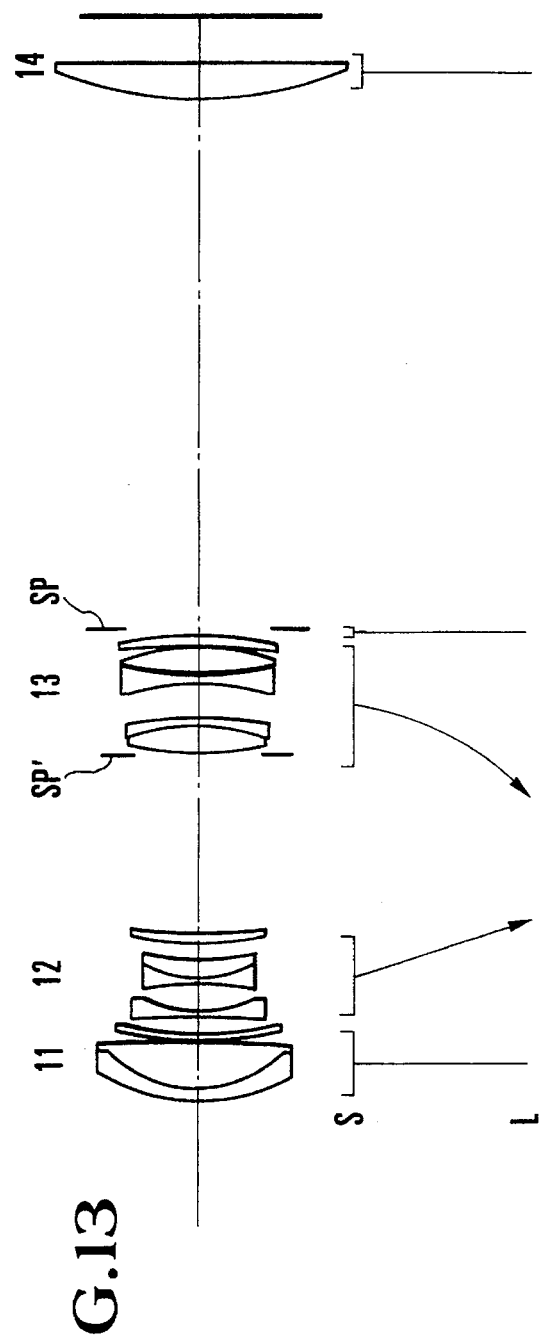

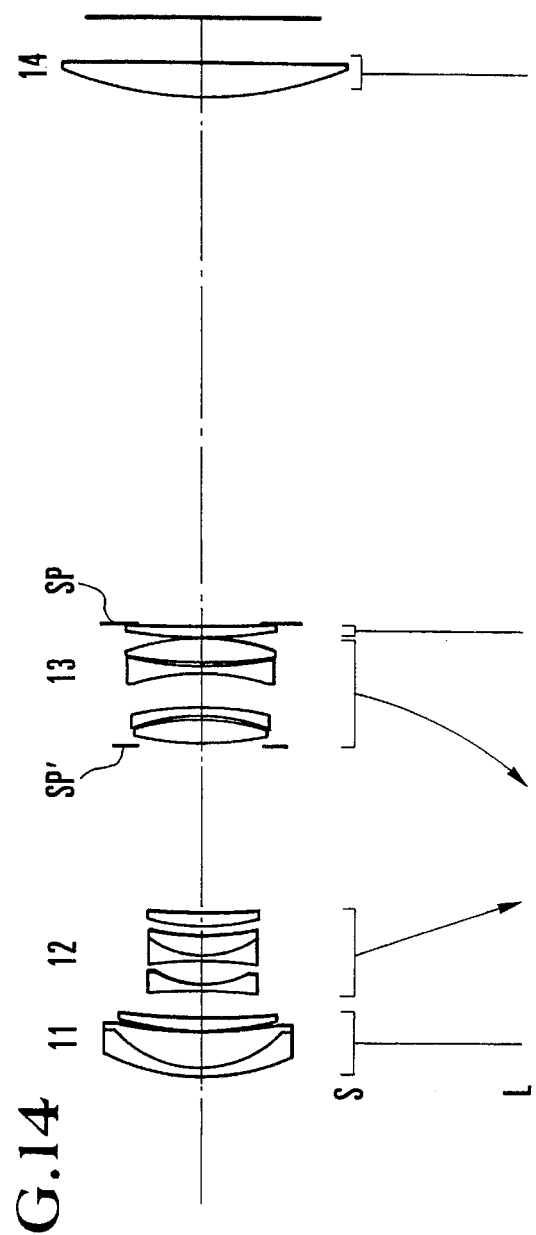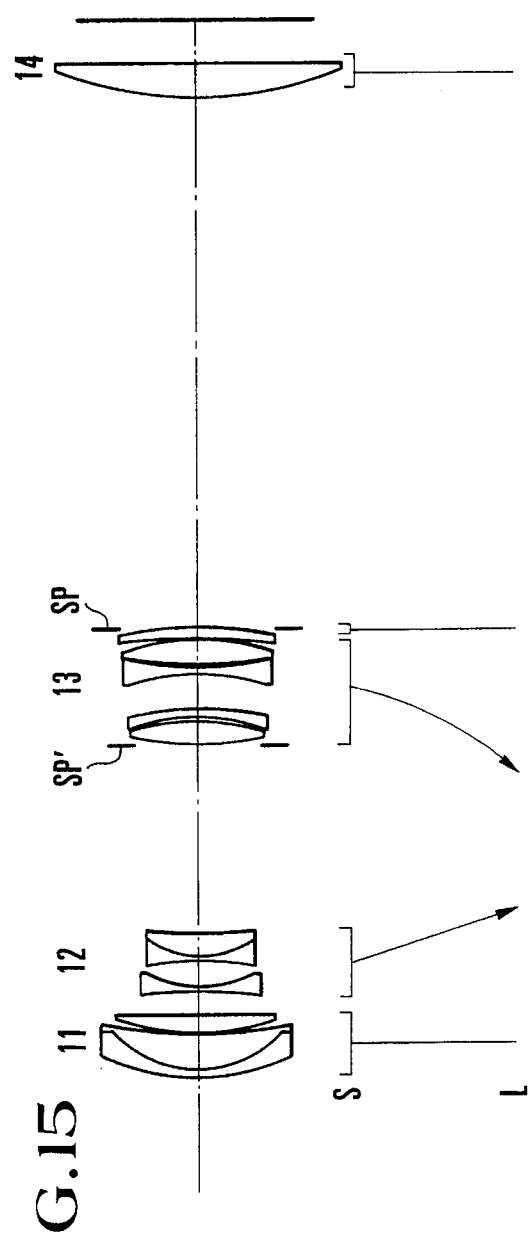

ECLIPSE OCCURRING

ZOOM LENS FOR PROJECTING VIDEO IMAGE

BACKGROUND OF THE INVENTION

1. Field of the Invention

This invention relates to zoom lenses and, more particularly, to zoom lenses suited to be used for projecting video images.

2. Description of the Related Art

Recently, either projectors for casting a single video image onto a screen, or projection systems in which a pair of video images are projected onto a screen in superimposed relation, are widely used. To display the video image, either a cathode ray tube or a liquid crystal display panel is employed. In the case of the liquid crystal display panel, an illuminating unit is provided.

For the projection lenses, what is capable of zooming is used as, for example, described in Japanese Laid-Open Patent Application No. Hei 5-27174.

Some of these zoom lenses have large distortional aberration in the zooming region of from the shortest focal length to a middle focal length. To improve the illumination of the projected image, two projectors can be used as shown by M and N in FIG. 28A. In this case, the two projected images on the screen S have to fit in each other. As distortion is present, however, the two projected images deviate from each other in the marginal zone as depicted in FIG. 28B, where the image quality is lowered exceedingly, thereby giving rise to a serious problem.

Meanwhile, FIG. 29 schematically shows a liquid crystal projector. Three liquid crystal panels 21, 22 and 23 for different primary colors are followed, toward a light source 27, by respective condenser lenses 24, 25 and 26 in juxtapositioned relation. Mirrors 28a to 28c distribute the illuminating light. Other mirrors 28d to 28f combine the images. A projection lens 29 is arranged to form an image of the light source 27 in the pupil position thereof. In this instance of FIG. 29, a parabolic reflector is positioned behind the light source 27. For another case, a condenser lens is further used in front of the light source 27.

To improve the aperture efficiency, a microlens array may be attached to the liquid crystal display panel as shown in FIG. 30. In this case, the angle of incidence of the illuminating light on the liquid crystal display panel deviates from the normal (the telecentric form collapses) as it goes to the margin. Thus, eclipse occurs as shown in FIG. 31. In the prior art, therefore, another problem arises in that the liquid crystal display panel becomes darker toward the margin of the image frame.

SUMMARY OF THE INVENTION

An object of the invention is to provide a zoom lens of good imaging performance.

Another object of the invention is to provide a zoom lens which assures projection of an image in a good state.

Still another object of the invention is to provide a zoom lens well corrected for distortion.

A further object of the invention is to provide a zoom lens which avoids lowering of illumination of the projected image.

Other objects of the invention will become apparent from the following description.

BRIEF DESCRIPTION OF THE DRAWINGS

FIG. 12 is a lens block diagram of a numerical example 3 of the invention.

FIG. 13 is a lens block diagram of a numerical example 4 of the invention.

FIG. 14 is a lens block diagram of a numerical example 5 of the invention.

FIG. 15 is a lens block diagram of a numerical example 6 of the invention.

DETAILED DESCRIPTION OF THE PREFERRED EMBODIMENTS

Figure 1:
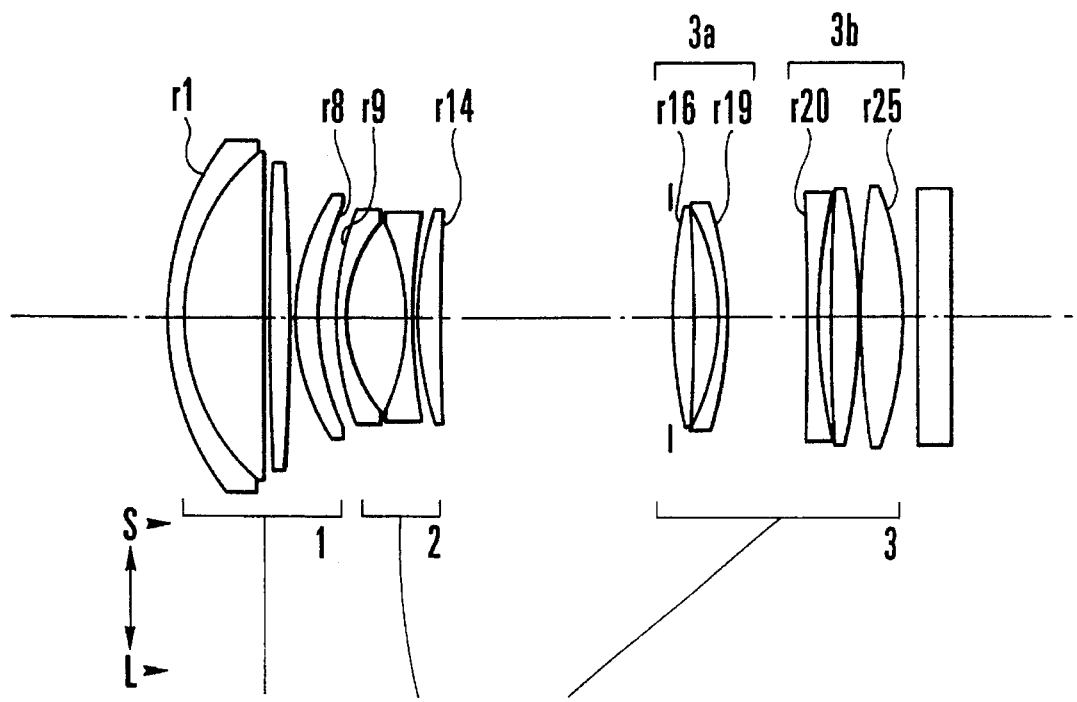
FIG. 1 is a lens block diagram of a numerical example 1 of the invention.
Figure 2:
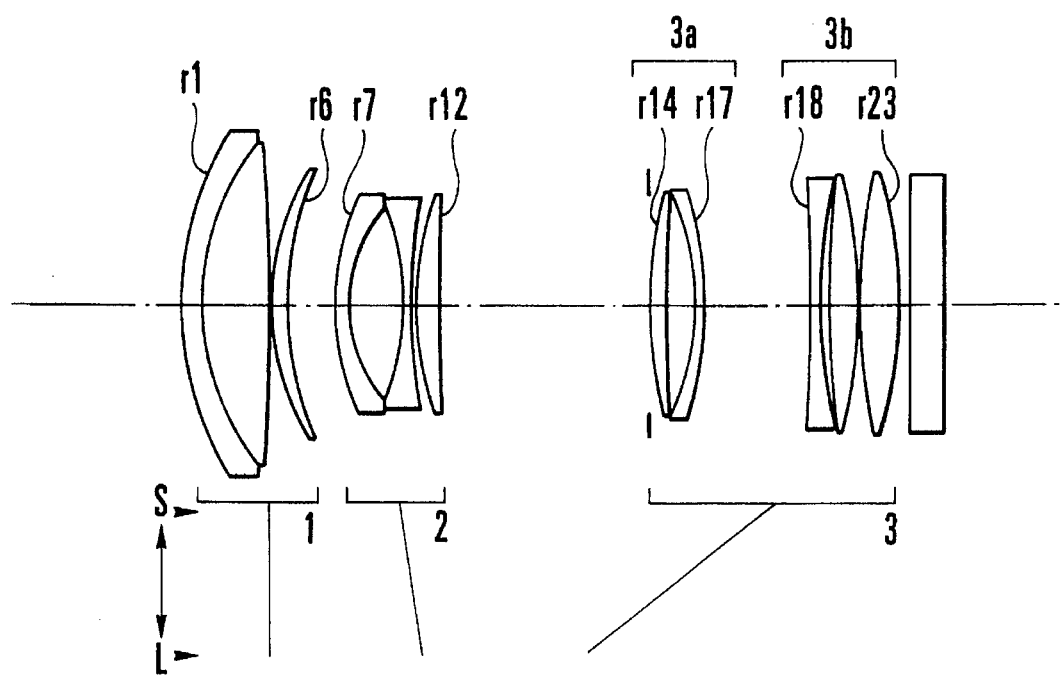
FIG. 2 is a lens block diagram of a numerical example 2 of the invention.
Figure 3:
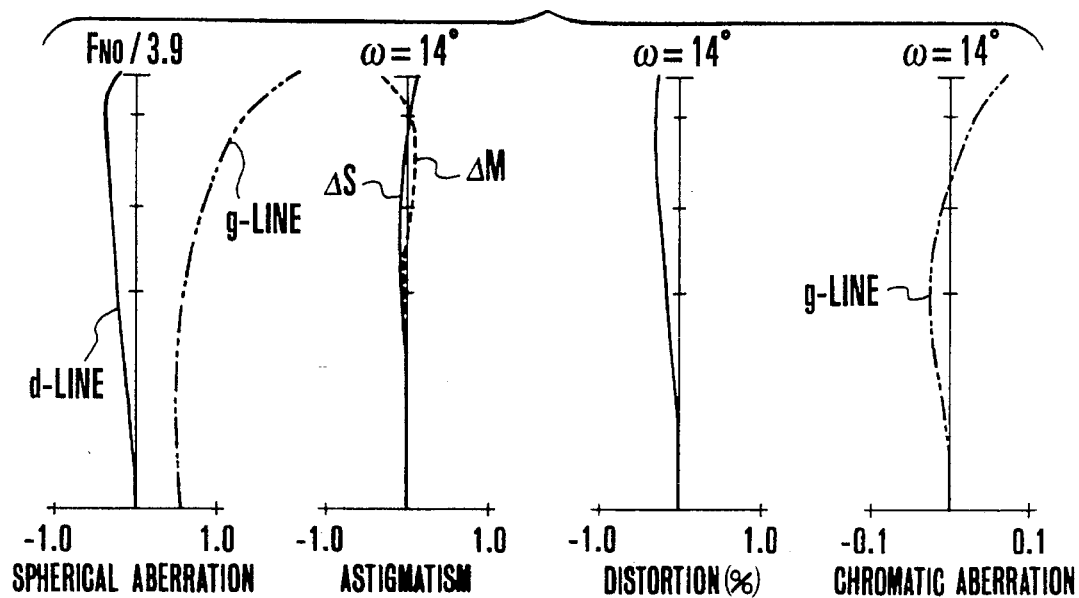
FIG. 3 shows graphs of the various aberrations of the numerical example 1 of the invention in the shortest focal length end.
Figure 4:
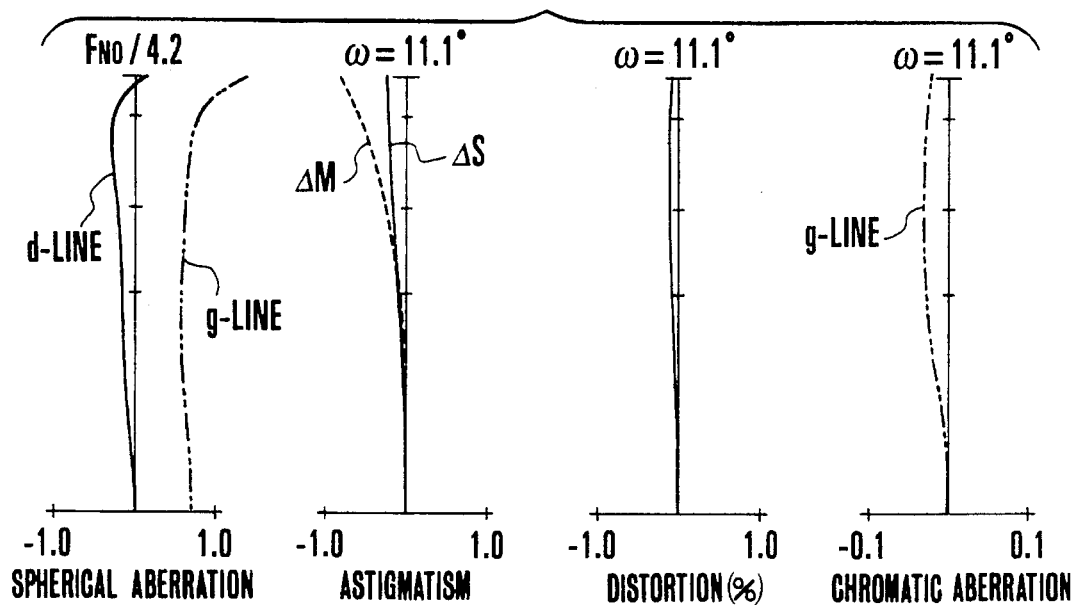
FIG. 4 shows graphs of the various aberrations of the numerical example 1 of the invention in a middle focal length position.
Figure 5:
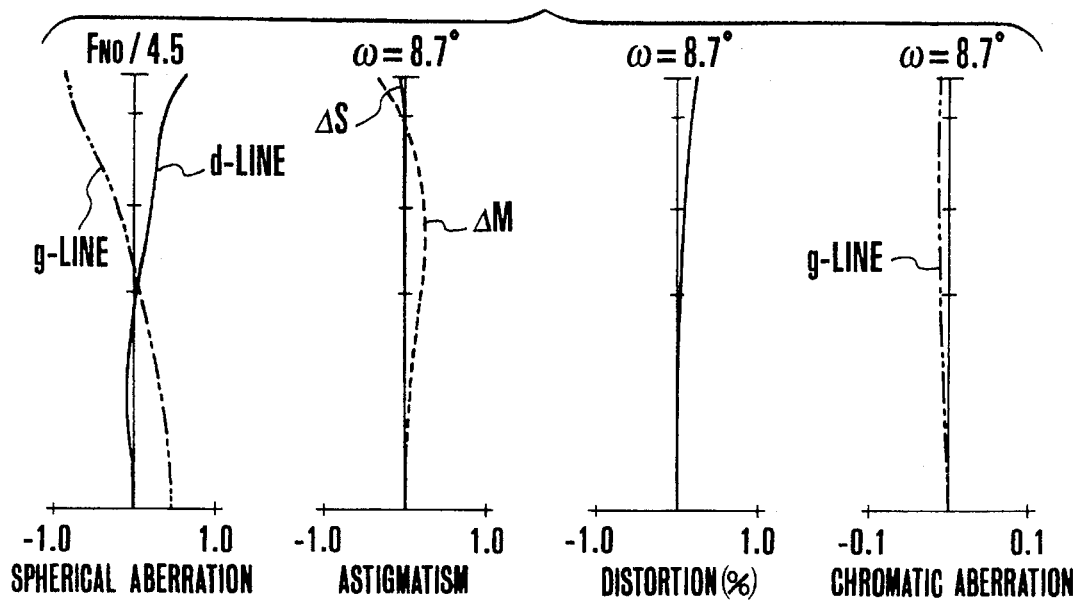
FIG. 5 shows graphs of the various aberrations of the numerical example 1 of the invention in the longest focal length end.
Figure 6:
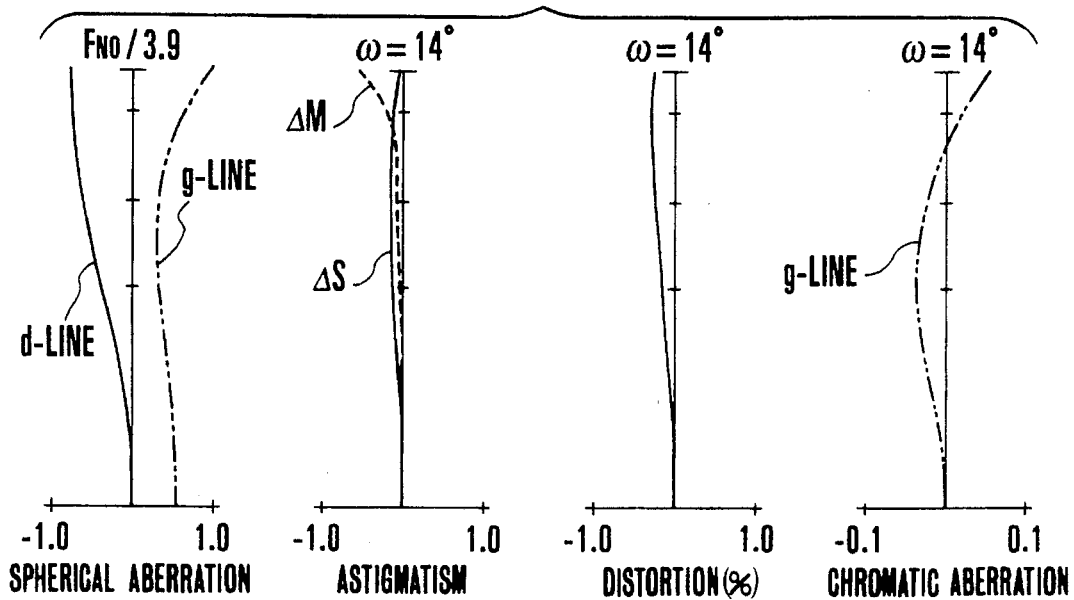
FIG. 6 shows graphs of the various aberrations of the numerical example 2 of the invention in the shortest focal length end.
Figure 7:
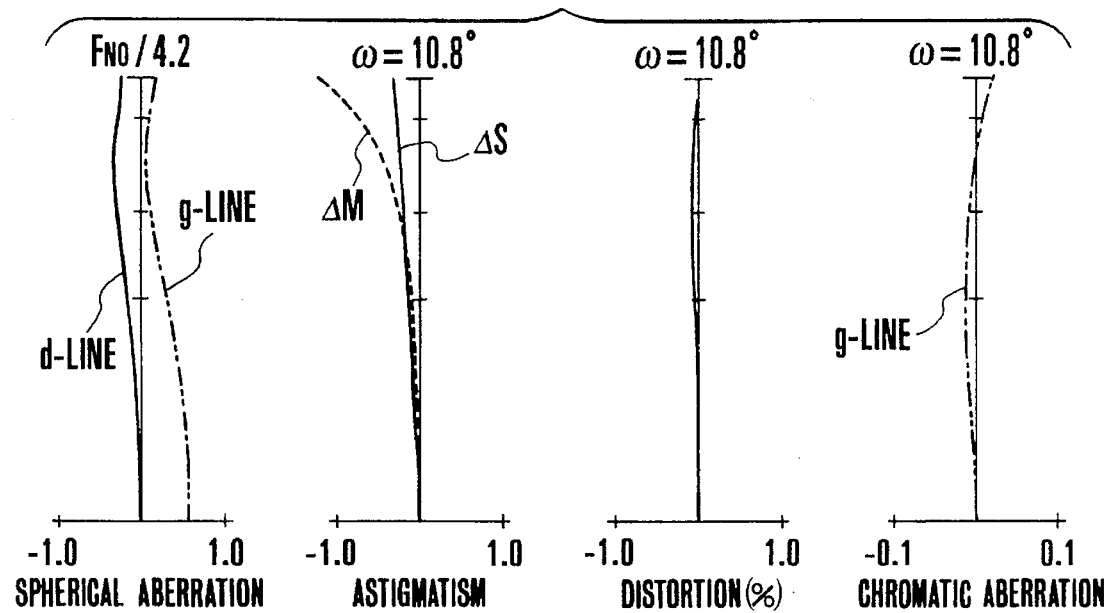
FIG. 7 shows graphs of the various aberrations of the numerical example 2 of the invention in a middle focal length position.
Figure 8:
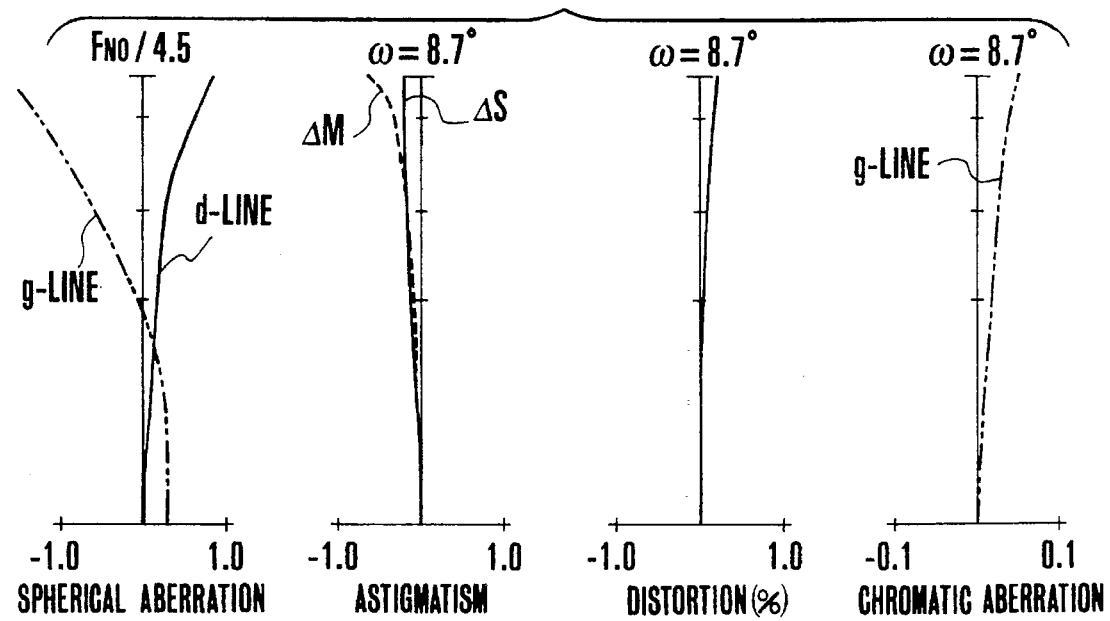
FIG. 8 shows graphs of the various aberrations of the numerical example 2 of the invention in the longest focal length end.

The present invention is next described in connection with embodiments thereof by reference to the drawings. FIG. 1 and FIG. 2 respectively show numerical examples 1 and 2 of an embodiment of a zoom lens according to the invention for which the numerical data will be cited later.

Reference numeral 1 denotes a first lens unit of positive refractive power, as viewed from the screen (not shown) (or the large conjugate side), reference numeral 2 denotes a second lens unit of negative refractive power, and reference numeral 3 denotes a third lens unit of positive refractive power. When zooming from the shortest focal length end S to the longest focal length end L, the second and third lens units move axially in respective loci shown by the solid line curves.

According to the invention, the zoom lens comprises, in order from the large conjugate side, a first lens unit of positive refractive power, a second lens unit of negative refractive power and a third lens unit of positive refractive power, wherein when zooming from the shortest focal length side to the longest focal length side, the air separation between the first and second lens units increases, and the air separation between the second and third lens units decreases, wherein the first, second and third lens units each have at least one aspheric surface, and wherein the following condition (1) is satisfied, thus making it possible to maintain the distortional aberration at a very small value throughout the entire zooming range.

$$|D_{12d}/D_{23d}|<0.25 \tag{1}$$

where $D_{12d}$: the amount of variation of the air separation between the first and second lens units as zooming from the shortest focal length end to the longest focal length end; and $D_{23d}$: the amount of variation of the air separation between the second and third lens units as zooming from the shortest focal length end to the longest focal length end.

In this connection, it is to be noted that, according to one method, the separation between the first and second lens units increases monotonously, while the separation between the second and third lens units simultaneously decreases monotonously.

Another feature is that in the configuration described above, the first lens unit is made stationary during zooming, thereby giving advantages, particularly the one that the operating mechanism is simplified in structure, while still maintaining realization of a zoom lens capable of reducing the distortional aberration to a very small value throughout the entire zooming range to be achieved.

For the third lens unit, on the other hand, a front lens sub-unit 3a, as viewed from the large conjugate side, is followed, after a longest air separation within the third lens unit, toward the small conjugate side, by a rear lens sub-unit 3b. It is preferable that the rear lens sub-unit 3b has at least one aspheric surface.

It is also preferable to satisfy the following conditions:

$$0.5<f_1/f_s<0.7 \tag{2}$$

$$0.2<-f_2/f_s<0.4 \tag{3}$$

$$0.4<f_3/f_s<1 \tag{4}$$

where $f_1$: the focal length of the first lens unit;

$f_2$: the focal length of the second lens unit;

$f_3$: the focal length of the third lens unit; and $f_s$: the shortest focal length of the entire system.

It is recommended that the first lens unit is constructed as comprising, in order from the large conjugate side, a negative meniscus lens convex toward the large conjugate side, at least one positive lens and a positive meniscus lens convex toward the large conjugate side.

It is also recommended that the second lens unit is constructed as comprising, in order from the large conjugate side, a negative meniscus lens convex toward the large conjugate side, a bi-concave lens and a positive lens having a strong power on the large conjugate side.

It is also recommended that the third lens unit is constructed as comprising, in order from the large conjugate side, a positive lens having a strong power on the large conjugate side, a negative meniscus lens convex toward the small conjugate side, a bi-concave lens having a strong power on the small conjugate side, a positive lens having a strong power on the small conjugate side and a bi-convex lens.

Further, it is desirable that the positive meniscus lens in the first lens unit satisfies the following condition:

$$SF_{1r}<-3 \tag{5}$$

where $SF_{1r}=(R_{1Grf}+R_{1Grr})/(R_{1Grf}-R_{1Grr})$ wherein $R_{1Grf}$: the radius of curvature of the surface of the large conjugate side of the positive meniscus lens in the first lens unit; and $R_{1Grr}$: the radius of curvature of the surface of the small conjugate side of the positive meniscus lens in the first lens unit.

Further, it is desirable that the negative meniscus lens in the second lens unit satisfies the following condition:

$$1.5<SF_{2f}<4 \tag{6}$$

where $SF_{2f}=(R_{2Gff}+R_{2Gfr})/(R_{2Gff}-R_{2Gfr})$ wherein $R_{2Gff}$: the radius of curvature of the surface of the large conjugate side of the negative meniscus lens in the second lens unit; and $R_{2Gfr}$: the radius of curvature of the surface of the small conjugate side of the negative meniscus lens in the second lens unit.

It is to be noted that the complete lens may further include at least one lens unit behind the third lens unit.

The problem described before is solved by using at least one aspheric surface in each of the first to third lens units and by satisfying the condition (1). As desired, one of the conditions (2) to (6) or their combinations is satisfied.

The inequality of condition (1) gives a range for the ratio of the amount of variation of the air separation between the first and second lens units to the amount of variation of the air separation between the second and third lens units with zooming from the shortest focal length end to the longest focal length end. Outside this range, the amount of variation of the air separation between the first and second lens units becomes relatively large. Therefore, the principal ray of the off-axial light beam in the first and second lens units varies in height a too large extent with zooming from the shortest focal length end to the longest focal length end. Even if the aspheric surface is used in each lens unit, it becomes difficult to suppress the variation of the distortional aberration to a minimum.

The reason why it is on the small conjugate side of the third lens unit, or in the rear lens sub-unit 3b thereof, that the aspheric surface is used, is that the height of the off-axial principal ray is highest in the third lens unit, which is advantageous for correcting distortion.

The inequalities of condition (2) give a range for the ratio of the focal length of the first lens unit to the shortest focal length of the entire system. In a range beyond the lower limit of the condition (2), because the power of the first lens unit is relatively too strong, spherical aberration and longitudinal chromatic aberration increase. In a range beyond the upper limit of the condition (2), because the power of the first lens unit is relatively too weak, the distortional aberration becomes under-corrected (the pincushion type for the projected image on the screen) objectionably.

The inequalities of condition (3) give a range for the ratio of the focal length of the second lens unit to the shortest focal length of the entire system. In a range beyond the lower limit of the condition (3), because the power of the second lens unit is relatively too strong, the distortional aberration becomes liable to under-correct and the curvature of field becomes liable to over-correct. In a range beyond the upper limit of the condition (3), because the power of the second lens unit is relatively too weak, the distortional aberration becomes liable to over-correct (to be the barrel type for the projected image on the screen), and the curvature of field becomes liable to under-correct. These are not preferable.

The inequalities of condition (4) give a range for the ratio of the focal length of the third lens unit to the shortest focal length of the entire system. In a range beyond the lower limit of the condition (4), because the power of the third lens unit is relatively too strong, the back focal distance becomes short. In a range beyond the upper limit of the condition (4), the total length of the complete lens becomes long. These are not preferable.

Also, the reason for the first lens unit to be constructed from, in order from the large conjugate side, the meniscus lens convex toward the large conjugate side, at least one positive lens and the positive meniscus lens convex toward the large conjugate side, for the second lens unit to be constructed from, in order from the large conjugate side, the negative meniscus lens convex toward the large conjugate side, the bi-concave lens, the positive lens having the strong power on the large conjugate side, and for the third lens unit to be constructed from, in order from the large conjugate side, the positive lens having the strong power on the large conjugate side, the negative meniscus lens convex toward the small conjugate side, the bi-concave lens having the strong power on the small conjugate side, the positive lens having the strong power on the small conjugate side and the bi-convex lens, is to suppress the distortional aberration to a minimum throughout the entire zooming range, and also to correct well spherical aberration and comatic aberration.

Further, the inequality of condition (5) gives a range for the shape of the positive meniscus lens in the first lens unit. In a range beyond the upper limit of the condition (5), the amount of variation of the distortional aberration with zooming increases objectionably.

Further, the inequalities of condition (6) gives range for the shape of the negative meniscus lens in the second lens unit. In ranges beyond the lower and upper limits of the condition (6), the amount of variation of the distortional aberration with zooming increases objectionably.

Figure 9:
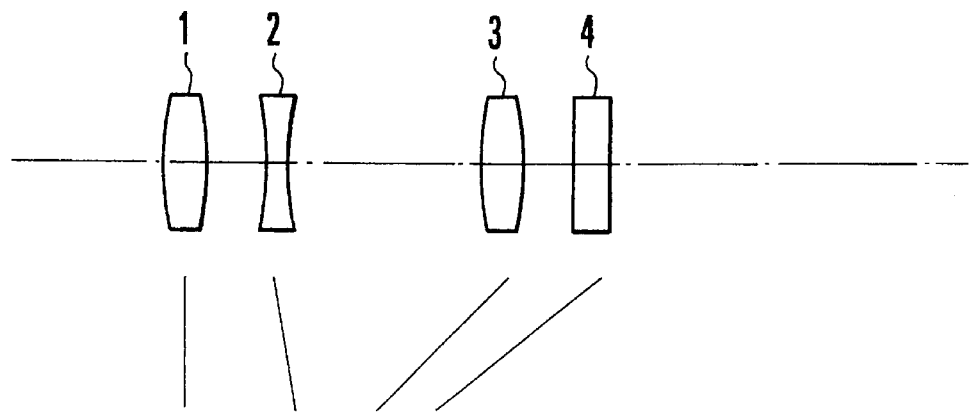
FIG. 9 is a diagram of the optical arrangement of another embodiment of the invention.

Further, as shown in FIG. 9, a lens unit 4 of positive or negative refractive power may be added to the small conjugate side of the third lens unit and the separation between the third and fourth lens units is made to vary with zooming. By this, the aberration correction can be further improved.

Figure 10:
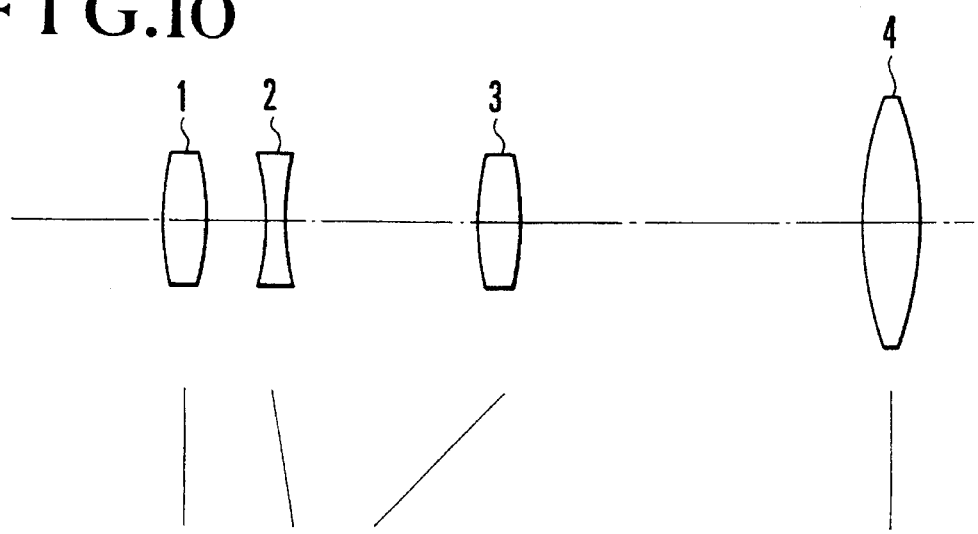
FIG. 10 is a diagram of the optical arrangement of still another embodiment of the invention.

Also, as shown in FIG. 10, a positive lens unit 4 may be arranged adjacent to the small conjugate point to be stationary during zooming. Thus, it can be applied so that the optical system becomes telecentric to the small conjugate point.

Figure 11:
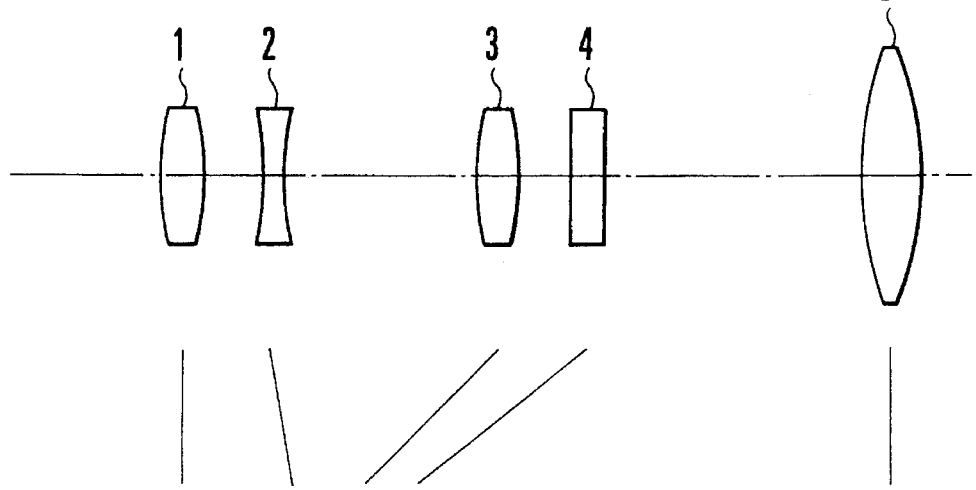
FIG. 11 is a diagram of the optical arrangement of yet another embodiment of the invention.

Also, as shown in FIG. 11, a lens unit 4 of positive or negative refractive power is added to the small conjugate side of the third lens unit and the separation between the third and fourth lens units is made to vary with zooming. In addition, a fixed positive lens 5 is arranged adjacent to the small conjugate point. Even for the telecentric optical system to the small conjugate point, a further improvement of the aberration correction can thus be done. Incidentally, the lens units 4 and 5 may be either single lenses, or constructed with a plurality of lenses.

Numerical examples 1 and 2 are shown below, wherein:

ri is the radius of curvature of the i-th lens surface, when counted from the large conjugate side;

di is the separation between the i-th and (i+1)st lens surfaces, when counted from the large conjugate side;

ni is the refractive index for the spectral d-line of the i-th lens element, when counted from the large conjugate side; and vi is the Abbe number of the i-th lens element, when counted from the large conjugate side.

The shape of an aspheric surface is expressed by the following equation:

$$X = (y^2/r)/(1 + \sqrt{1 - (1+K) \cdot (y/r)^2}) + A4 \cdot y^4 + A6 \cdot y^6 + A8 \cdot y^8 \ldots$$

where r: the radius of paraxial curvature; and
K: the conic definition.

Numerical Example 1

| f = 332.18 | Fno = 1:3.9–4.5 | | 2ω = 27.9°–17.4° |
|---|---|---|---|
| r1 = 130.153 | d1 = 7.20 | n1 = 1.64769 | ν1 = 33.8 |
| r2 = 93.623 | d2 = 0.04 | | |
| r3 = 93.625 | d3 = 32.00 | n2 = 1.49700 | ν2 = 81.6 |
| r4 = ∞ | d4 = 3.00 | | |
| r5 = 1888.468 | d5 = 9.00 | n3 = 1.49700 | ν3 = 81.6 |
| r6 = −786.327 | d6 = 1.00 | | |
| r7 = 96.740 | d7 = 9.00 | n4 = 1.60311 | ν4 = 60.7 |
| r8 = 101.405 | d8 = Variable | | |
| r9 = 132.593 | d9 = 4.00 | n5 = 1.60311 | ν5 = 60.7 |
| r10 = 59.833 | d10 = 24.51 | | |
| r11 = −103.743 | d11 = 4.00 | n6 = 1.69680 | ν6 = 55.5 |
| r12 = 246.030 | d12 = 1.17 | | |
| r13 = 152.584 | d13 = 9.50 | n7 = 1.80518 | ν7 = 25.4 |
| r14 = 1822.449 | d14 = Variable | | |
| r15 = (Stop) | d15 = 1.00 | | |
| r16 = 229.550 | d16 = 8.50 | n8 = 1.63854 | ν8 = 55.4 |
| r17 = −4881.298 | d17 = 10.58 | | |
| r18 = −103.395 | d18 = 4.50 | n9 = 1.58144 | ν9 = 40.8 |
| r19 = −151.422 | d19 = 32.83 | | |
| r20 = −1491.458 | d20 = 4.80 | n10 = 1.69895 | ν10 = 30.1 |
| r21 = 229.497 | d21 = 5.22 | | |
| r22 = 1655.739 | d22 = 11.60 | n11 = 1.48749 | ν11 = 70.2 |
| r23 = −218.760 | d23 = 0.20 | | |
| r24 = 345.168 | d24 = 18.00 | n12 = 1.48749 | ν12 = 70.2 |
| r25 = −151.000 | d25 = Variable | | |
| r26 = ∞ | d26 = 15.00 | n13 = 1.51633 | ν13 = 64.2 |
| r27 = ∞ | | | |

| Variable Separation | Focal Length | | | |
|---|---|---|---|---|
| | 332.18 | 420.87 | 538.06 | 370.69 |
| d8 | 8.46 | 9.31 | 14.46 | 7.65 |
| d14 | 95.45 | 46.48 | 3.53 | 70.48 |
| d25 | 5.00 | 53.11 | 90.92 | 30.77 |

| Aspheric Surface | Aspheric Coefficients | | |
|---|---|---|---|
| | | K | A4 |
| r7 | $9.67400 \times 10^1$ | $-3.13155 \times 10^{-1}$ | $2.32400 \times 10^{-10}$ |
| r9 | $1.32593 \times 10^2$ | $2.85233 \times 10^{-1}$ | $6.44640 \times 10^{-8}$ |
| r25 | $-1.51000 \times 10^2$ | $3.49161 \times 10^{-1}$ | $1.53605 \times 10^{-8}$ |

| | A6 | A8 | A10 |
|---|---|---|---|
| r7 | $-1.70320 \times 10^{-12}$ | $-3.51876 \times 10^{-16}$ | $-4.50171 \times 10^{-20}$ |
| r9 | $-1.87939 \times 10^{-12}$ | $-2.72072 \times 10^{-15}$ | $1.85391 \times 10^{-19}$ |
| r25 | $3.36534 \times 10^{-13}$ | $-7.86741 \times 10^{-16}$ | $1.07456 \times 10^{-19}$ |

Numerical Example 2

| f = 332.28 | Fno = 1:3.9–4.5 | | 2ω = 27.9°–17.4° | |
| --- | --- | --- | --- | --- |
| r1 = 141.662 | d1 = 6.50 | n1 = 1.64769 | v1 = 33.8 |
| r2 = 102.228 | d2 = 0.04 | | |
| r3 = 102.234 | d3 = 30.74 | n2 = 1.49700 | v2 = 81.6 |
| r4 = −627.594 | d4 = 0.20 | | |
| r5 = 103.661 | d5 = 7.15 | n3 = 1.48749 | v3 = 70.2 |
| r6 = 134.867 | d6 = Variable | | |
| r7 = 127.896 | d7 = 4.00 | n4 = 1.60311 | v4 = 60.7 |
| r8 = 57.906 | d8 = 25.31 | | |
| r9 = −98.662 | d9 = 4.00 | n5 = 1.69680 | v5 = 55.5 |
| r10 = 251.551 | d10 = 1.17 | | |
| r11 = 158.777 | d11 = 9.50 | n6 = 1.80518 | v6 = 25.4 |
| r12 = 2311.826 | d12 = Variable | | |
| r13 = (Stop) | d13 = 1.00 | | |
| r14 = 220.057 | d14 = 7.44 | n7 = 1.62299 | v7 = 58.2 |
| r15 = 1771.463 | d15 = 11.02 | | |
| r16 = −103.691 | d16 = 4.50 | n8 = 1.59551 | v8 = 39.2 |
| r17 = −138.362 | d17 = 42.87 | | |
| r18 = −1475.218 | d18 = 4.80 | n9 = 1.68893 | v9 = 31.1 |
| r19 = 229.497 | d19 = 4.39 | | |
| r20 = 810.349 | d20 = 11.66 | n10 = 1.48749 | v10 = 70.2 |
| r21 = −194.378 | d21 = 0.20 | | |
| r22 = 302.259 | d22 = 16.71 | n11 = 1.48749 | v11 = 70.2 |
| r23 = −189.870 | d23 = Variable | | |
| r24 = ∞ | d24 = 15.00 | n12 = 1.51633 | v12 = 64.2 |
| r25 = ∞ | | | |

| Variable | Focal Length | | |
| --- | --- | --- | --- |
| Separation | 332.28 | 431.80 | 537.93 |
| d6 | 18.63 | 22.45 | 27.33 |
| d12 | 86.96 | 39.24 | 2.59 |
| d23 | 5.00 | 48.90 | 80.68 |

| Aspheric Surface | Aspheric Coefficients | | |
| --- | --- | --- | --- |
| | | K | A4 |
| r5 | $1.03661 \times 10^2$ | $-3.08390 \times 10^{-1}$ | $1.51254 \times 10^{-9}$ |
| r7 | $1.27896 \times 10^2$ | $4.82669 \times 10^{-1}$ | $6.94841 \times 10^{-8}$ |
| r23 | $-1.89870 \times 10^2$ | $2.15270 \times 10^0$ | $3.11381 \times 10^{-8}$ |

| | A6 | A8 |
| --- | --- | --- |
| r5 | $-3.23557 \times 10^{-12}$ | $8.35699 \times 10^{-17}$ |
| r7 | $8.89238 \times 10^{-12}$ | $-4.10720 \times 10^{-15}$ |
| r23 | $1.08856 \times 10^{-12}$ | $-2.10636 \times 10^{-17}$ |

According to the embodiment described above, a zoom lens of extremely small distortion, say, 0.3% distortion throughout the entire zooming range can be realized.

In application of the zoom lens of this embodiment to a liquid crystal projector using superimposing projection for the purpose of improving the illumination, therefore, the split of the picture element is very small even in the marginal zone of the projected image frame. Thus, the obtained image on projection is excellent in quality and bright in contrast.

Subsequently, another embodiment will be described with the low illumination of the image in mind.

FIG. 12 to FIG. 15 depict the longitudinal sections of numerical examples 3 to 6 of zoom lenses for which the numerical data will be listed later.

Figure 29:
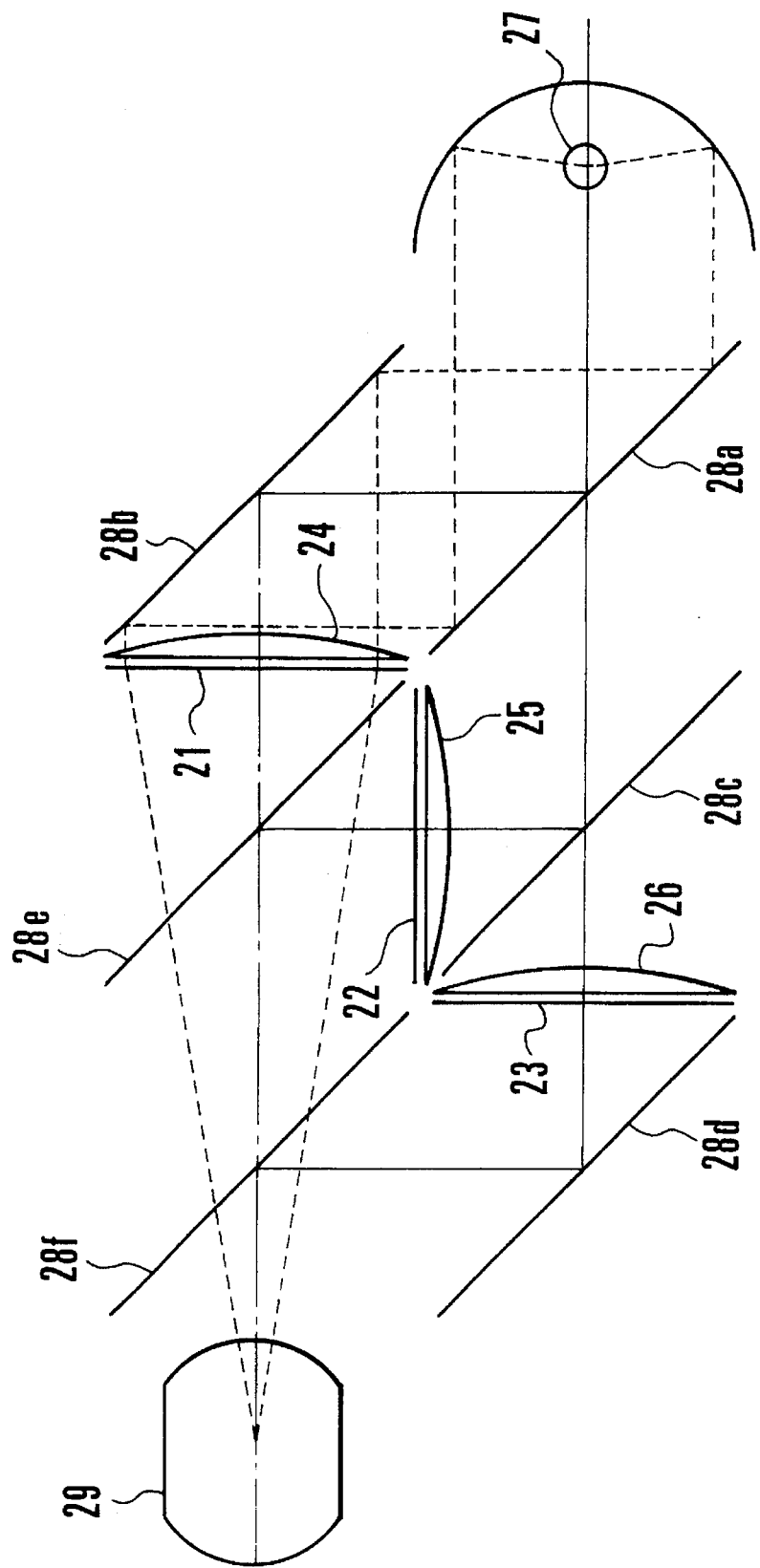
FIG. 29 is a longitudinal section view of the optics of a projector with liquid crystal display panels.
Figure 30:
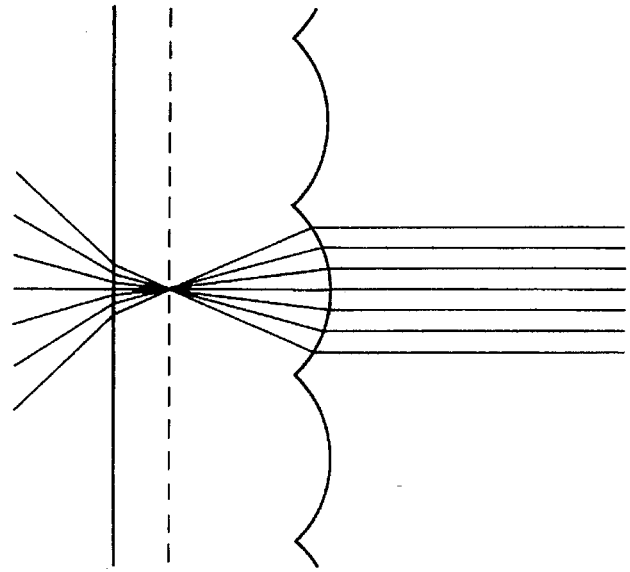
FIG. 30 is a fragmentary sectional view of the liquid crystal display panel with supplement of a microlens array.
Figure 31:
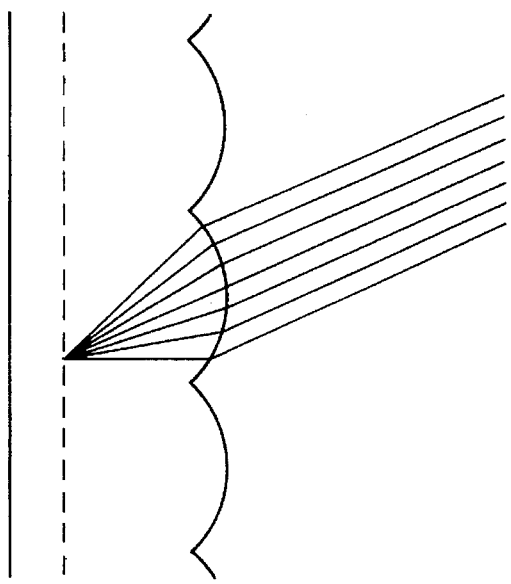
FIG. 31 is similar to FIG. 30 except for eclipse.

Reference numeral 10 denotes a screen. Reference numeral 11 denotes a lens unit on the large conjugate side, or a first lens unit, having a positive refractive power. Successively in order toward the small conjugate side, a movable second lens unit 12 of negative refractive power, a stop SP carried on a movable third lens unit 13 of positive refractive power which is divided into a front lens sub-unit 13a and a rear lens sub-unit 13b with the longest space in the third lens unit intervening therebetween, another stop SP Which is axially fixed, and a fixed fourth lens unit 14 of positive refractive power, which, in this instance, is comprised of a positive lens having a strong convex surface facing the large conjugate side, are arranged on a common optical axis. Between the third and fourth lens units 13 and 14, there is a largest space for the composite mirror system shown in FIG. 29 to occupy. Reference numeral 15 denotes a liquid crystal panel equipped with a microlens array. The zooming movements from the shortest focal length end S to the longest focal length end L take place in the loci as shown by the solid line curves with the arrows indicating the axial directions.

The fourth lens unit 14 is positioned adjacent to the small conjugate point and is made to satisfy a condition (7) and/or a condition (8) to be described later.

Also, when zooming from the shortest focal length end to the longest focal length end, the second lens unit moves toward the small conjugate side and the third lens unit moves to the large conjugate side, so that the variation of the focal length is shared by the second and third lens units. Thus, a high zoom ratio is obtained by the short total zooming movements.

A zoom lens according to the invention comprises, in order from the large conjugate side, a first lens unit of positive refractive power, a second lens unit of negative refractive power, a third lens unit of positive refractive power and a fourth lens unit of positive refractive power, wherein when zooming from the shortest focal length end to the longest focal length end, the lens units axially move in such relation that the air separation between the first and second lens units increases and the air separation between the second and third lens units decreases, and either or both of the following conditions are satisfied to thereby achieve a good telecentric arrangement:

$$0 \leq bf_s/f_s < 0.3 \quad (7)$$

$$1 < f_4/f_s < 3 \quad (8)$$

where $bf_s$: the back focal distance with the large conjugate point at infinity;

$f_4$: the focal length of the fourth lens unit; and $f_s$: the shortest focal length of the entire system.

Meanwhile, a first lens unit of positive refractive power, a second lens unit of negative refractive power, a third lens unit of positive refractive power and a fourth lens unit of positive refractive power are arranged in this order from the large conjugate side, on zooming from the shortest focal length end to the longest focal length end to axially move in such relation that the air separation between the first and second lens units increases and the air separation between the second and third lens units decreases, wherein the following condition is satisfied to thereby make it possible to realize a zoom lens of good telecentric arrangement:

$$0.15 < D_{23s}/D_{34s} < 0.6 \quad (9)$$

where $D_{23a}$: the air separation for the shortest focal length end between the second and third lens unit; and $D_{34s}$: the air separation for the shortest focal length end between the third and fourth lens units.

Further, it is desirable to satisfy the following conditions:

$$0.5 < f_1/f_s < 1.5 \quad (10)$$

$$0.2 < -f_2/f_s < 0.5 \quad (11)$$

$$0.4 < f_3/f_s < 1.3 \quad (12)$$

where $f_1$: the focal length of the first lens unit;

$f_2$: the focal length of the second lens unit; and $f_3$: the focal length of the third lens unit.

Further, it is desirable to satisfy the following condition:

$$0.16 < N_{2p} - N_{2n} < 0.3 \quad (13)$$

where $N_{2p}$: the mean value of the refractive indices of the positive lenses in the second lens unit; and $N_{2n}$: the mean value of the refractive indices of the negative lenses in the second lens unit.

Further, it is desirable that the third lens unit is made up from a front lens sub-unit 13a of large conjugate side and a rear lens sub-unit 13b of small conjugate side with the longest air separation in the third lens unit intervening therebetween, and satisfies the following condition:

$$0.03 < D_{3ab}/f_3 < 0.2 \quad (14)$$

where $D_{3ab}$: the air separation between the front lens sub-unit 13a and the rear lens sub-unit 13b.

Further, it is desirable that the second lens unit is constructed as comprising, in order from the large conjugate side, a negative lens having a strong power on the small conjugate side, a cemented negative lens with the cemented surface convex toward the large conjugate side and a positive lens having a strong power on the large conjugate side.

Further, it is desirable that a fixed stop is arranged in between the third and fourth lens units to be stationary relative to the small conjugate point.

Further, it is desirable that the fourth lens unit is constructed with one positive single lens and satisfies the following condition:

$$-3.1 < SF_4 < -0.3 \quad (15)$$

where $SF_4 = (r_{4f} + r_{4r})/(r_{4f} - r_{4r})$ wherein $r_{4f}$: the radius of curvature of the large conjugate side of the positive single lens of the fourth lens unit; and $r_{4r}$: the radius of curvature of the small conjugate side of the positive single lens of the fourth lens unit.

The significances of the above-described conditions are explained below.

The inequalities of condition (7) give a range for the ratio of the back focal distance with the large conjugate point at infinity to the shortest focal length of the entire system. In a range beyond the lower limit of the condition (7), the liquid crystal panel 15 and the fourth lens unit 14 mechanically interfere with each other. In a range beyond the upper limit of the condition (7), because the light beam in the fourth lens unit gets a wide width, it becomes difficult to correct comatic aberration and astigmatic difference. So, it is objectionable.

The inequalities of condition (8) give a range for the ratio of the focal length of the fourth lens unit to the shortest focal length of the entire system. Outside the range of the condition (8), the telecentric feature collapses largely. So, it is objectionable.

The inequalities of condition (9) give a range for the ratio of the air separation for the shortest focal length end between the second and third lens units 12 and 13 to the air separation for the shortest focal length end between the third and fourth lens units 13 and 14. In a range beyond the lower limit of the condition (9), the zoom ratio cannot take a large value. In a range beyond the upper limit of the condition (9), the zoom ratio can be taken at the large value, but the complete lens either increases in size, or too short an air separation results between the third and fourth lens units 13 and 14, thereby making it difficult to insert the color combining system into the space between the third and fourth lens units 13 and 14.

The inequalities of condition (10) give a range for the ratio of the focal length of the first lens unit 11 to the shortest focal length of the entire system. In a range beyond the lower limit of the condition (10), the first lens unit 11 gets too short a focal length, thereby making it difficult to correct the longitudinal chromatic aberration and spherical aberration of the entire system. In a range beyond the upper limit of the condition (10), the total length increases objectionably.

The inequalities of condition (11) give a range for the ratio of the focal length of the second lens unit 12 to the shortest focal length of the entire system. In a range beyond the lower limit of the condition (11), the negative power of the second lens unit is so strong that over-correction of field curvature results. Also, the distortion gets under-corrected in the shortest focal length end. In a range beyond the upper limit of the condition (11), the negative refractive power is so weak that, in some cases, under-correction of field curvature results. In other cases, the required amount of movement of the second lens unit for obtaining a predetermined zoom ratio increases objectionably.

The inequalities of condition (12) give a range for the ratio of the focal length of the third lens unit to the shortest focal length of the entire system. In a range beyond the lower limit of the condition (12), the third lens unit 13 gets too small a focal length. Therefore, the air separation between the third and fourth lens units 13 and 14 becomes impossible to take a large value. Therefore, it becomes difficult to insert the color combining system into the space between the third and fourth lens units 13 and 14. In a range beyond the upper limit of the condition (12), the third lens unit gets too long a focal length. Therefore, the conjugate point interval of the third lens unit is too long. Therefore, the total length of the complete lens becomes too long. So, it is objectionable.

The inequalities of condition (13) give a range for the difference between the mean value of the refractive indices of the positive lenses in the second lens unit 12 and the mean value of the negative lenses in the second lens unit 12. In a range beyond the lower limit of the condition (13), over-correction of field curvature results. In a range beyond the upper limit of the condition (13), under-correction of field curvature results. Also, the distortion gets under-corrected in the shortest focal length end. So, it is objectionable. The field curvature the fourth lens unit produces as under-corrected is corrected by making high the refractive index of the positive lens of the second lens unit, and by making low the refractive index of the negative lens.

The inequalities of condition (14) give a range for the ratio of the air separation between the front lens sub-unit 13$a$ and the rear lens sub-unit 13$b$ to the focal length of the third lens unit 13. In a range beyond the lower limit of the condition (14), the separation between the front and rear lens sub-units is too short. Therefore, it becomes difficult to correct coma. In a range beyond the upper limit of the condition (14), the physical length of the third lens unit 13 is long. Therefore, the size of the complete lens gets larger objectionably.

Further, to minimize the variation of distortion with zooming, the second lens unit 12 is constructed as comprising, in order from the large conjugate side, a negative lens having a strong power on the small conjugate side, a cemented negative lens with the cemented surface convex toward the large conjugate side and a positive lens having a strong power on the large conjugate side.

The inequalities of condition (15) give a range for the shape of the positive single lens of the fourth lens unit 14. In a range beyond the lower limit of the condition (15), the distortion is over-corrected in the shortest focal length end. In a range beyond the upper limit of the condition (15), the distortion is under-corrected in the shortest focal length end.

Further, to reduce the flare of the off-axial light in the longest focal length end, a fixed stop is arranged in the space between the third and fourth lens units to be stationary relative to the small conjugate point.

Numerical examples 3 to 6 are shown below. In the numerical data, ri is the radius of curvature of the i-th lens surface, when counted from the large conjugate side;

di is the separation between the i-th and (i+1)st lens surfaces, when counted from the large conjugate side;

ni is the refractive index of the glass of the i-th lens element, when counted from the large conjugate side; and vi is the Abbe number of the glass of the i-th lens element, when counted from the large conjugate side.

Numerical Example 3

| f = 160.08–320.19 | Fno = 1:4.4–5.1 | 2ω = 34.6°–17.6° | |
|---|---|---|---|
| r1 = 89.248 | d1 = 3.90 | n1 = 1.69895 | v1 = 30.1 |
| r2 = 48.948 | d2 = 17.20 | n2 = 1.62299 | v2 = 58.2 |
| r3 = −2309.665 | d3 = 0.20 | | |
| r4 = 135.823 | d4 = 3.50 | n3 = 1.51633 | v3 = 64.2 |
| r5 = 172.599 | d5 = Variable | | |
| r6 = −314.523 | d6 = 2.60 | n4 = 1.51742 | v4 = 52.4 |
| r7 = 59.396 | d7 = 9.20 | | |
| r8 = −123.252 | d8 = 2.40 | n5 = 1.70154 | v5 = 41.2 |
| r9 = 44.224 | d9 = 6.65 | n6 = 1.84666 | v6 = 23.8 |
| r10 = 87.870 | d10 = 5.95 | | |
| r11 = 132.016 | d11 = 4.50 | n7 = 1.84666 | v7 = 23.8 |
| r12 = 910.264 | d12 = Variable | | |
| r13 = (Stop) | d13 = 1.00 | | |
| r14 = 120.444 | d14 = 9.85 | n8 = 1.72000 | v8 = 50.3 |
| r15 = −88.869 | d15 = 0.30 | | |
| r16 = −83.335 | d16 = 2.90 | n9 = 1.62004 | v9 = 36.3 |
| r17 = −169.996 | d17 = 13.75 | | |
| r18 = −100.065 | d18 = 3.20 | n10 = 1.67270 | v10 = 32.1 |
| r19 = 122.330 | d19 = 1.63 | | |
| r20 = 219.947 | d20 = 8.10 | n11 = 1.60311 | v11 = 60.7 |
| r21 = −118.258 | d21 = 0.20 | | |
| r22 = −597.368 | d22 = 4.30 | n12 = 1.69680 | v12 = 55.5 |
| r23 = −187.434 | d23 = Variable | | |
| r24 = (Stop) | d24 = Variable | | |
| r25 = 140.077 | d25 = 13.50 | n13 = 1.51633 | v13 = 64.2 |
| r26 = 96193.094 | | | |

| Variable | Focal Length | | |
|---|---|---|---|
| Separation | 160.08 | 224.22 | 320.19 |
| d2 | 5.78 | 16.29 | 24.32 |
| d12 | 66.38 | 39.12 | 7.40 |
| d23 | 2.00 | 18.75 | 42.44 |
| d24 | 201.50 | 201.50 | 201.50 |

Numerical Example 4

| f = 160.07–320.14 | Fno = 1:4.4–5.1 | 2ω = 34.6°–17.6° | |
|---|---|---|---|
| r1 = 88.670 | d1 = 3.90 | n1 = 1.69895 | ν1 = 30.1 |
| r2 = 48.462 | d2 = 17.31 | n2 = 1.62299 | ν2 = 58.2 |
| r3 = −1877.813 | d3 = 0.20 | | |
| r4 = 129.718 | d4 = 3.13 | n3 = 1.51633 | ν3 = 64.2 |
| r5 = 161.612 | d5 = Variable | | |
| r6 = −289.221 | d6 = 2.60 | n4 = 1.51742 | ν4 = 52.4 |
| r7 = 58.173 | d7 = 9.23 | | |
| r8 = −126.849 | d8 = 2.40 | n5 = 1.70154 | ν5 = 41.2 |
| r9 = 44.530 | d9 = 5.70 | n6 = 1.84666 | ν6 = 23.8 |
| r10 = 92.461 | d10 = 6.10 | | |
| r11 = 139.267 | d11 = 4.24 | n7 = 1.84666 | ν7 = 23.8 |
| r12 = 933.780 | d12 = Variable | | |
| r13 = (Stop) | d13 = 1.00 | | |
| r14 = 122.458 | d14 = 9.75 | n8 = 1.72000 | ν8 = 50.3 |
| r15 = −92.767 | d15 = 0.39 | | |
| r16 = −84.927 | d16 = 2.90 | n9 = 1.62004 | ν9 = 36.3 |
| r17 = −164.008 | d17 = 14.01 | | |
| r18 = −104.108 | d18 = 3.20 | n10 = 1.672670 | ν10 = 32.1 |
| r19 = 123.108 | d19 = 1.63 | | |
| r20 = 222.287 | d20 = 8.03 | n11 = 1.61800 | ν11 = 63.4 |
| r21 = −119.459 | d21 = 0.20 | | |
| r22 = −527.693 | d22 = 4.11 | n12 = 1.69680 | ν12 = 55.5 |
| r23 = −192.612 | d23 = Variable | | |
| r24 = (Stop) | d24 = Variable | | |
| r25 = 140.077 | d25 = 13.50 | n13 = 1.51633 | ν13 = 64.2 |
| r26 = 96193.094 | | | |

| Variable Separation | Focal Length | | |
|---|---|---|---|
| | 160.07 | 224.10 | 320.14 |
| d5 | 5.92 | 15.88 | 23.92 |
| d12 | 67.18 | 39.39 | 7.59 |
| d23 | 2.00 | 19.83 | 43.60 |
| d24 | 201.50 | 201.50 | 201.50 |

| Variable Separation | Focal Length | | |
|---|---|---|---|
| | 159.65 | 223.50 | 319.29 |
| d5 | 9.32 | 19.90 | 27.89 |
| d12 | 58.28 | 32.75 | 2.61 |
| d23 | 0.00 | 14.95 | 37.10 |
| d24 | 201.50 | 201.50 | 201.50 |

Numerical Example 5

| f = 159.65–379.29 | Fno = 1:4.4–5.1 | 2ω = 34.6°–17.8° | |
|---|---|---|---|
| r1 = 83.617 | d1 = 3.80 | n1 = 1.80518 | ν1 = 25.4 |
| r2 = 54.046 | d2 = 11.41 | n2 = 1.62299 | ν2 = 58.2 |
| r3 = 283.981 | d3 = 0.20 | | |
| r4 = 168.453 | d4 = 4.90 | n3 = 1.69680 | ν3 = 55.5 |
| r5 = 1159.321 | d5 = Variable | | |
| r6 = −249.459 | d6 = 2.50 | n4 = 1.51742 | ν4 = 52.4 |
| r7 = 50.468 | d7 = 9.64 | | |
| r8 = −117.377 | d8 = 2.30 | n5 = 1.70154 | ν5 = 41.2 |
| r9 = 47.474 | d9 = 7.08 | n6 = 1.84666 | ν6 = 23.8 |
| r10 = 125.548 | d10 = 4.00 | | |
| r11 = 149.451 | d11 = 4.00 | n7 = 1.84666 | ν7 = 23.8 |
| r12 = 763.468 | d12 = Variable | | |
| r13 = 0.000 (Stop) | d13 = 1.00 | | |
| r14 = 147.072 | d14 = 9.58 | n8 = 1.71300 | ν8 = 53.8 |
| r15 = −81.613 | d15 = 0.59 | | |
| r16 = −72.946 | d16 = 2.91 | n9 = 1.51742 | ν9 = 52.4 |
| r17 = −229.214 | d17 = 13.07 | | |
| r18 = −137.061 | d18 = 3.16 | n10 = 1.69895 | ν10 = 30.1 |
| r19 = 127.637 | d19 = 1.09 | | |
| r20 = 180.635 | d20 = 8.94 | n11 = 1.618000 | ν11 = 63.4 |
| r21 = −113.258 | d21 = 0.20 | | |
| r22 = 464.756 | d22 = 3.92 | n12 = 1.69680 | ν12 = 55.5 |
| r23 = −1255.577 | d23 = Variable | | |
| r24 = (Stop) | d24 = Variable | | |
| r25 = 140.000 | d25 = 13.50 | n13 = 1.51633 | ν13 = 64.2 |
| r26 = ∞ | | | |

Numerical Example 6

| f = 159.81–319.62 | Fno = 1:4.4–5.1 | | 2ω =34.6°–17.8° |
| --- | --- | --- | --- |
| r1 = 90.117 | d1 = 4.10 | n1 = 1.80518 | v1 = 25.4 |
| r2 = 56.547 | d2 = 14.32 | n2 = 1.62299 | v2 = 58.2 |
| r3 = 376.107 | d3 = 0.20 | | |
| r4 = 131.232 | d4 = 7.50 | n3 = 1.60311 | v3 = 60.7 |
| r5 = 5907.166 | d5 = Variable | | |
| r6 = –226.996 | d6 = 2.50 | n4 = 1.51742 | v4 = 52.4 |
| r7 = 48.093 | d7 = 12.20 | | |
| r8 = –114.060 | d8 = 2.30 | n5 = 1.65844 | v5 = 50.9 |
| r9 = 45.038 | d9 = 8.46 | n6 = 1.80518 | v6 = 25.4 |
| r10 = 258.949 | d10 = Variable | | |
| r11 = (Stop) | d11 = 1.00 | | |
| r12 = 151.424 | d12 = 9.11 | n7 = 1.71300 | v7 = 53.8 |
| r13 = –85.221 | d13 = 0.93 | | |
| r14 = –72.101 | d14 = 2.95 | n8 = 1.51742 | v8 = 52.4 |
| r15 = –206.083 | d15 = 11.81 | | |
| r16 = –117.890 | d16 = 3.22 | n9 = 1.69895 | v9 = 30.1 |
| r17 = 148.782 | d17 = 0.90 | | |
| r18 = 208.642 | d18 = 9.21 | n10 = 1.61800 | v10 = 63.4 |
| r19 = –98.681 | d19 = 0.20 | | |
| r20 = –651.299 | d20 = 3.98 | n11 = 1.69680 | v11 = 55.5 |
| r21 = –222.928 | d21 = Variable | | |
| r22 = (Stop) | d22 = Variable | | |
| r23 = 140.000 | d23 = 13.50 | n12 = 1.51633 | v12 = 64.2 |
| r24 = ∞ | | | |

| Variable | Focal Length | | |
| --- | --- | --- | --- |
| Separation | 159.81 | 223.73 | 319.62 |
| d5 | 7.76 | 15.16 | 21.51 |
| d10 | 68.28 | 41.42 | 11.18 |
| d21 | 0.00 | 19.46 | 43.35 |
| d22 | 201.50 | 201.50 | 201.50 |

| | Numerical Example | | | |
| --- | --- | --- | --- | --- |
| Condition No. | 3 | 4 | 5 | 6 |
| (7) | 0.088 | 0.088 | 0.095 | 0.094 |
| (8) | 1.697 | 1.697 | 1.698 | 1.697 |
| (9) | 0.326 | 0.330 | 0.289 | 0.339 |
| (10) | 0.848 | 0.841 | 0.825 | 0.744 |
| (11) | 0.366 | 0.366 | 0.352 | 0.321 |
| (12) | 0.741 | 0.744 | 0.713 | 0.717 |
| (13) | 0.23718 | 0.23718 | 0.23718 | 0.21725 |
| (14) | 0.116 | 0.118 | 0.115 | 0.103 |
| (15) | –1 | –1 | –1 | –1 |

Figure 16:
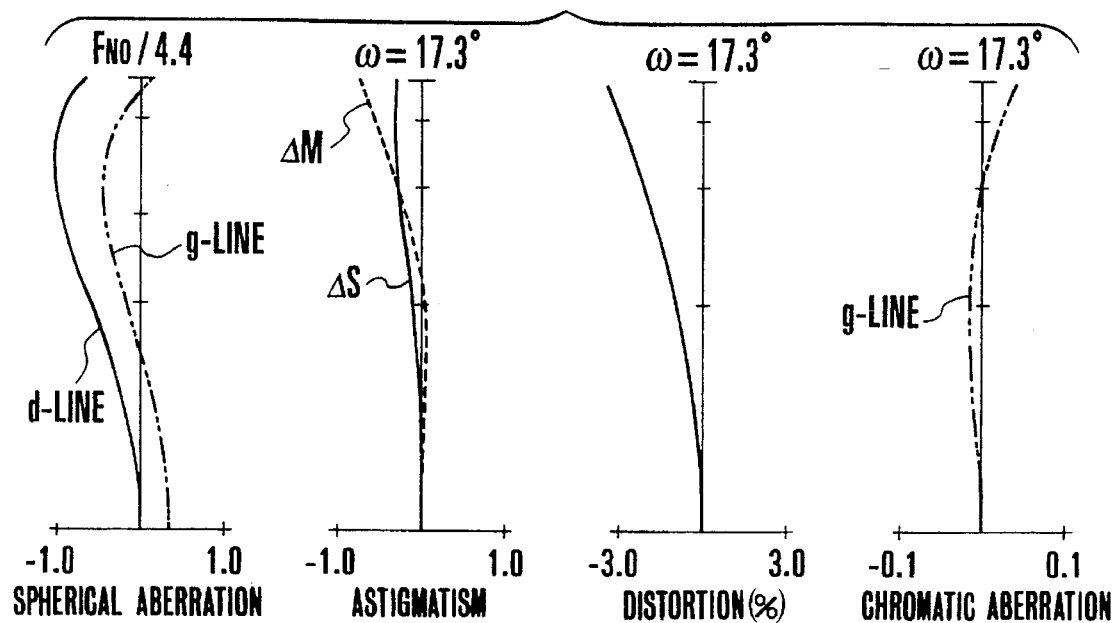
FIG. 16 shows graphs of the various aberrations of the numerical example 3 in the shortest focal length end.
Figure 17:
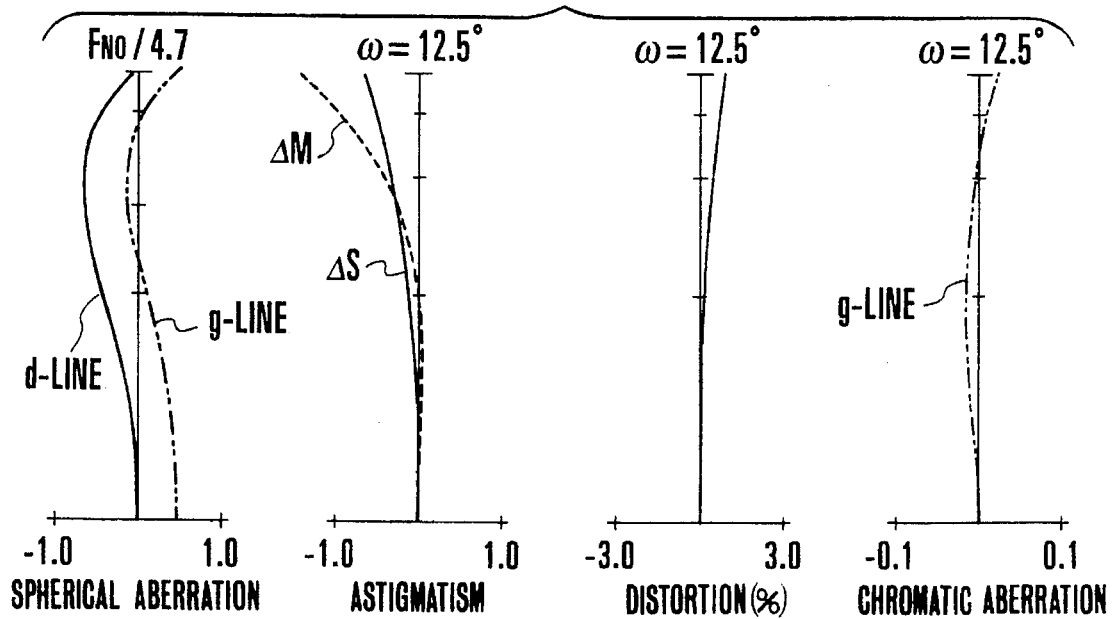
FIG. 17 shows graphs of the various aberrations of the numerical example 3 in a middle focal length position.
Figure 18:
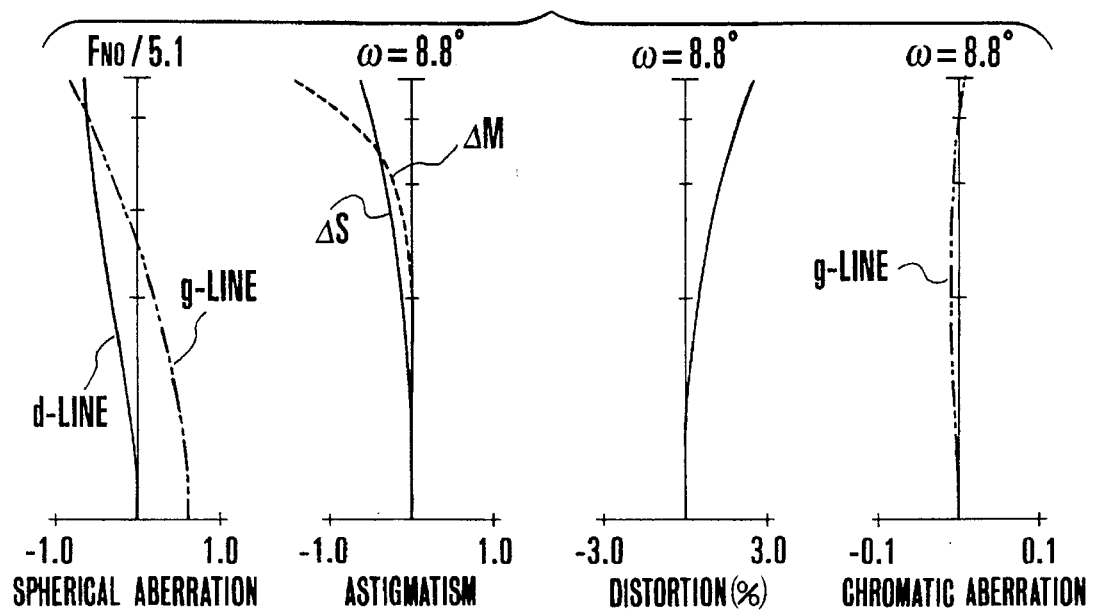
FIG. 18 shows graphs of the various aberrations of the numerical example 3 in the longest focal length end.
Figure 19:
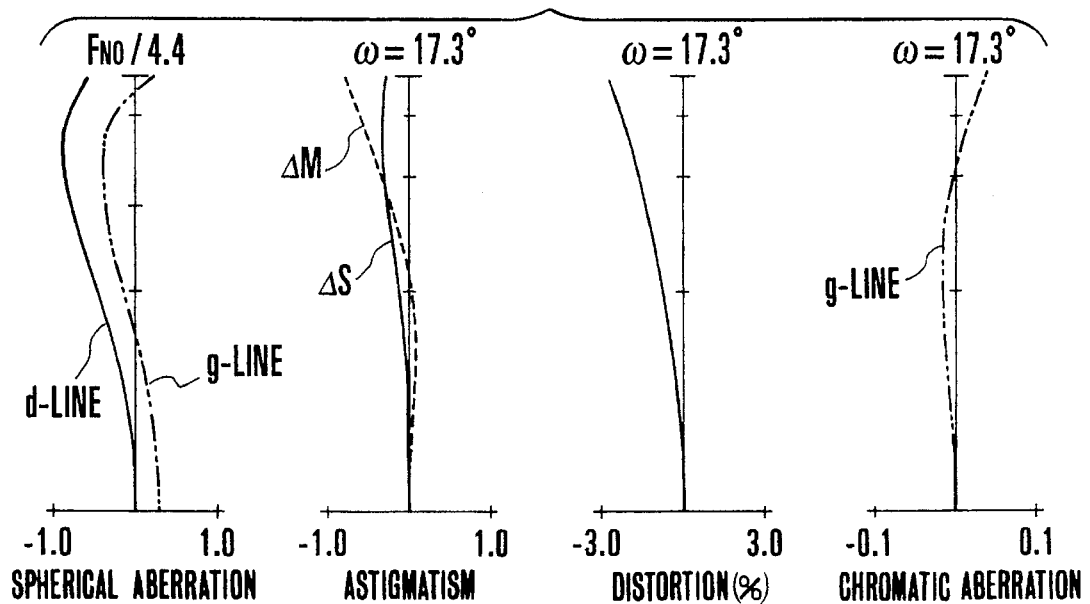
FIG. 19 shows graphs of the various aberrations of the numerical example 4 in the shortest focal length end.
Figure 20:
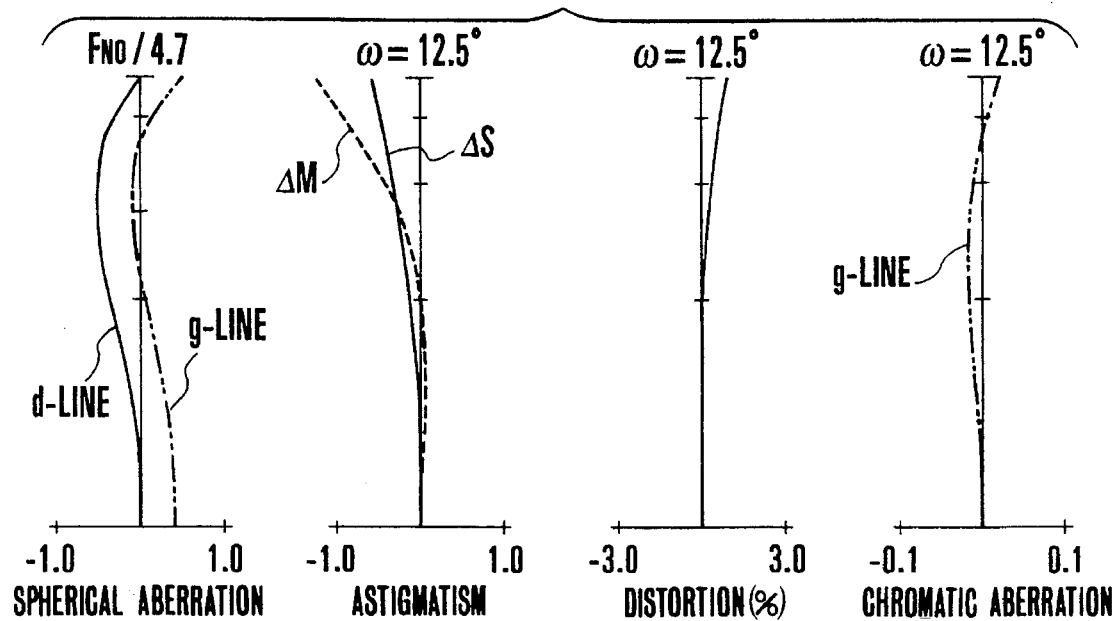
FIG. 20 shows graphs of the various aberrations of the numerical example 4 in a middle focal length position.
Figure 21:
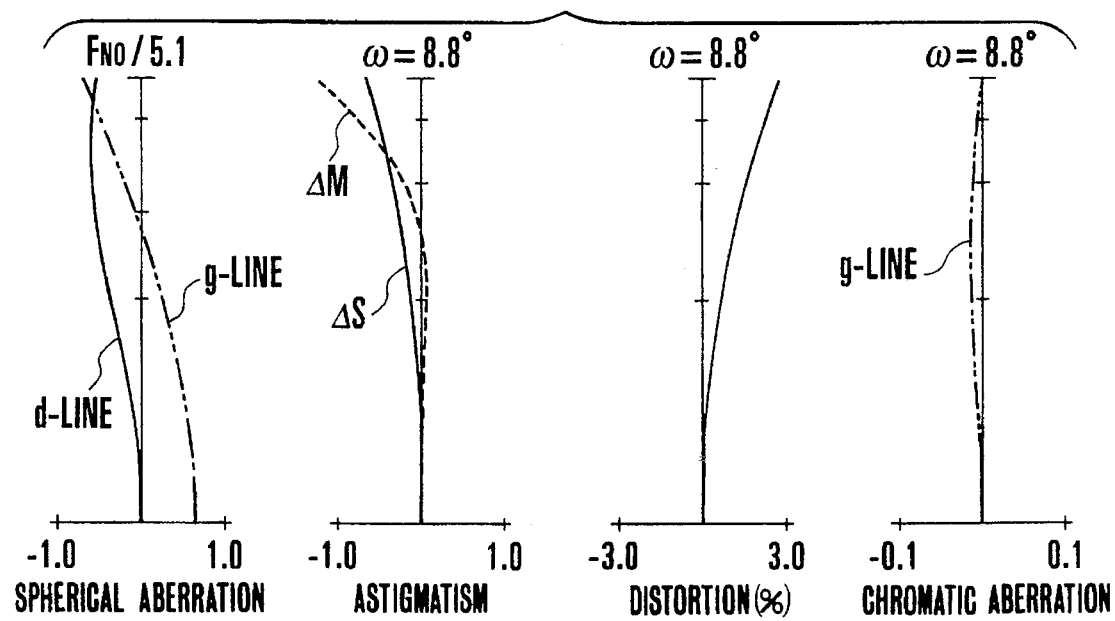
FIG. 21 shows graphs of the various aberrations of the numerical example 4 in the longest focal length end.
Figure 22:
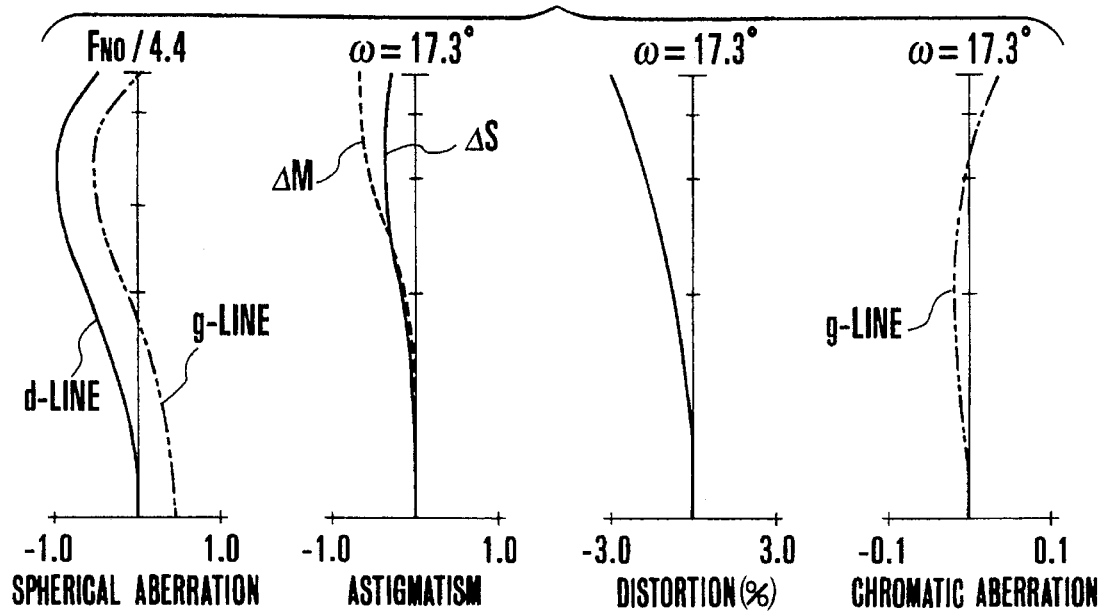
FIG. 22 shows graphs of the various aberrations of the numerical example 5 in the shortest focal length end.
Figure 23:
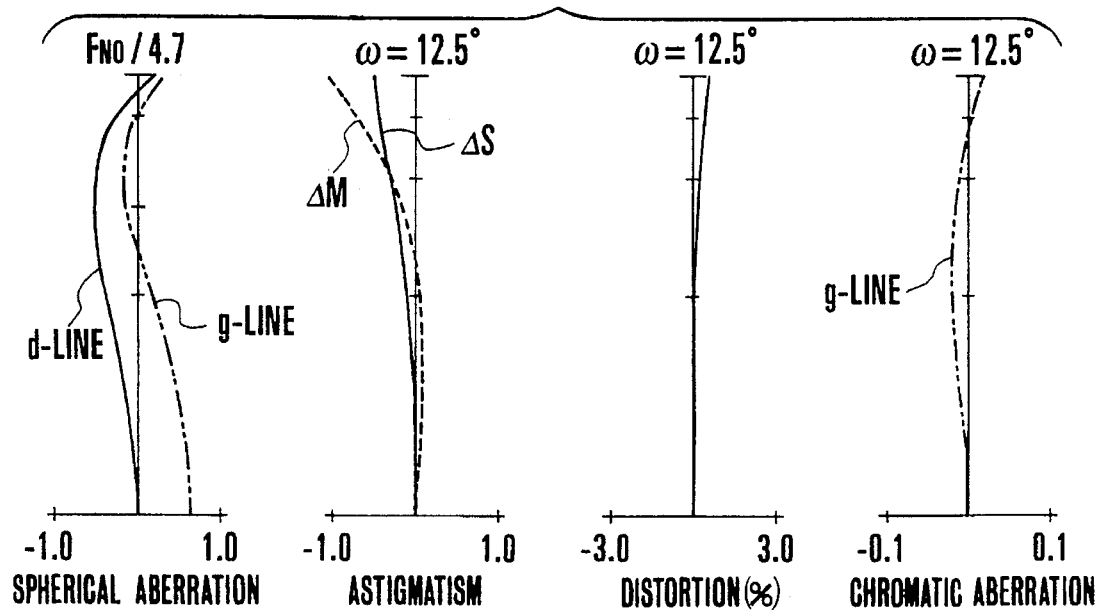
FIG. 23 shows graphs of the various aberrations of the numerical example 5 in a middle focal length position.
Figure 24:
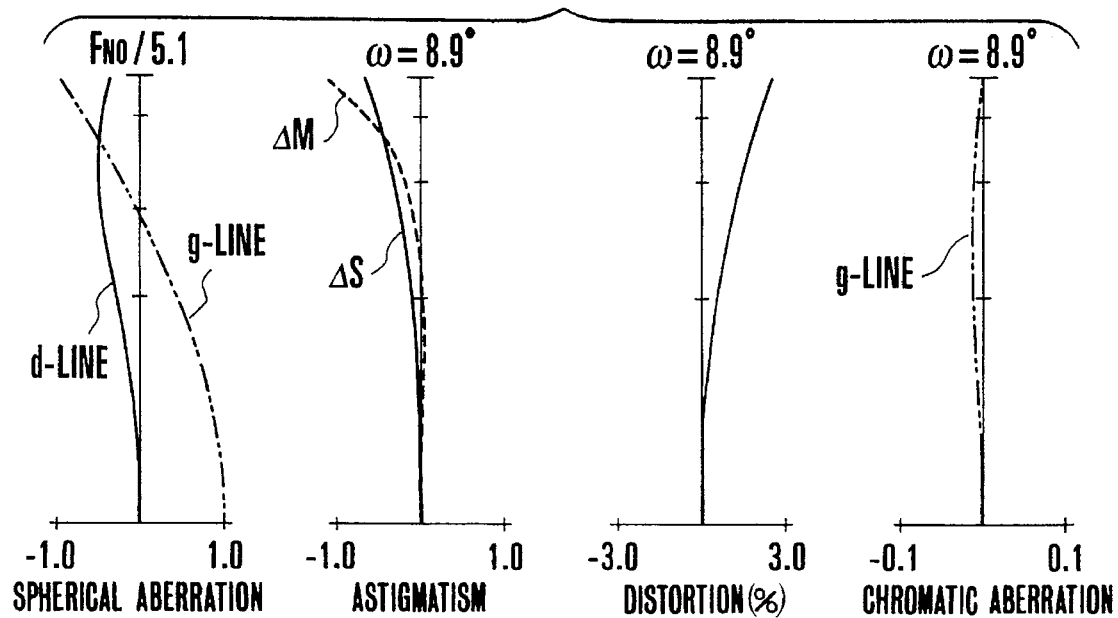
FIG. 24 shows graphs of the various aberrations of the numerical example 5 in the longest focal length end.
Figure 25:
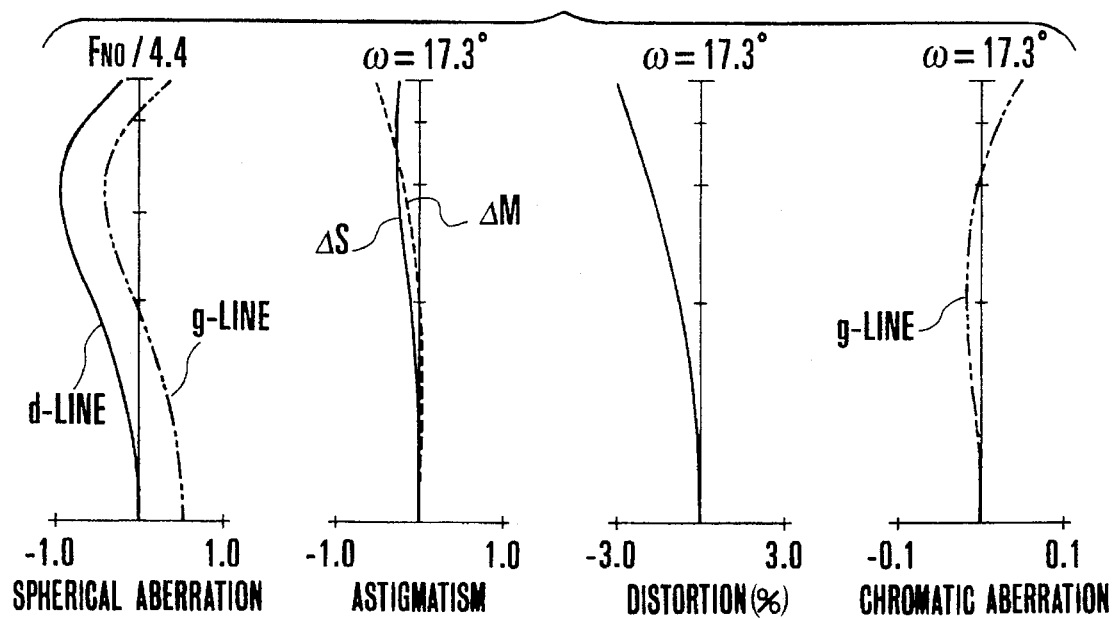
FIG. 25 shows graphs of the various aberrations of the numerical example 6 of the invention in the shortest focal length end.
Figure 26:
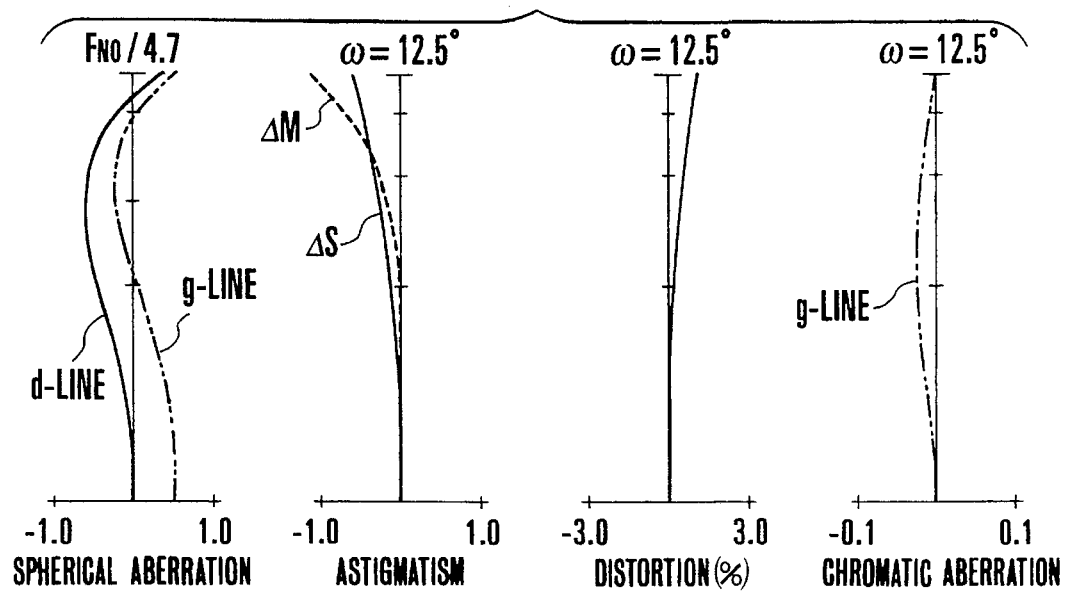
FIG. 26 shows graphs of the various aberrations of the numerical example 6 of the invention in a middle focal length position.
Figure 27:
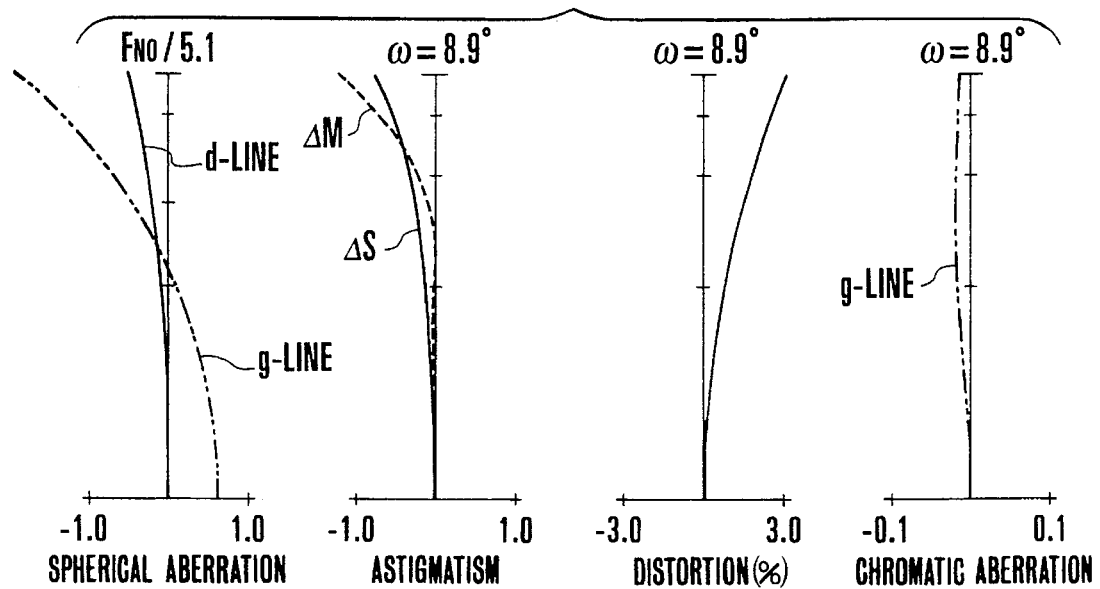
FIG. 27 shows graphs of the various aberrations of the numerical example 6 of the invention in the longest focal length end.
Figure 28A:
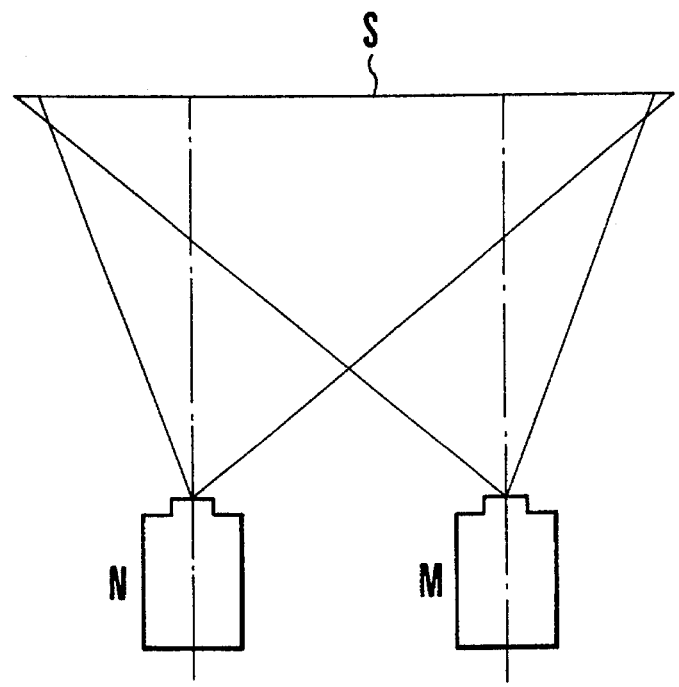
FIG. 28A is a top view showing the construction and arrangement of a video projection system.
Figure 28B:
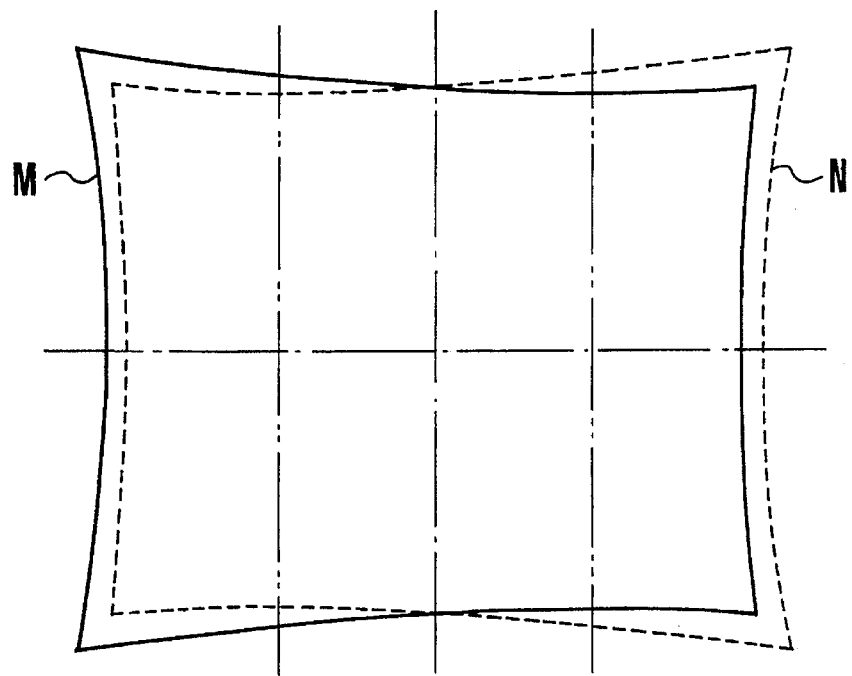
FIG. 28B is a plan view for explaining the correlation between the two images projected on the screen.

The various aberrations of the numerical example 3 in the shortest focal length end, a middle focal length position and the longest focal length end are shown in FIG. 16, FIG. 17 and FIG. 18, respectively. Likewise, the various aberrations of the numerical example 4 in the positions are shown in FIG. 19, FIG. 20 and FIG. 21. The various aberrations of the numerical example 5 in the positions are shown in FIG. 22, FIG. 23 and FIG. 24. The various aberrations of the numerical example 6 in the positions are shown in FIG. 25, FIG. 26 and FIG. 27.

What is claimed is:

1. A zoom lens comprising, in order from a large conjugate side to a small conjugate side, a first lens unit having a positive refractive power, a second lens unit having a negative refractive power and a third lens unit having a positive refractive power, wherein when zooming from a shortest focal length end to a longest focal length end, an air separation between said first and second lens units increases and an air separation between said second and third lens units decreases, wherein said first to third lens units each has at least one aspheric surface, and wherein the following condition is satisfied:

$$|D_{12d}/D_{23d}|<0.25$$

where $D_{12d}$: the amount of variation of the air separation between said first and second lens units with zooming from the shortest focal length end to the longest focal length end; and $D_{23d}$: the amount of variation of the air separation between said second and third lens units with zooming from the shortest focal length end to the longest focal length end.

2. A zoom lens according to claim 1, wherein, when zooming from the shortest focal length end to the longest focal length end, the air separation between said first and second lens units increases monotonously, and the separation between said second and third lens units decreases monotonously.

3. A zoom lens according to claim 1, wherein said first lens unit is stationary during zooming.

4. A zoom lens according to claim 1, wherein said third lens unit comprises a front lens sub-unit of large conjugate side and a rear lens sub-unit of small conjugate side with a longest air separation in said third lens unit intervening therebetween, and wherein said rear lens sub-unit has at least one aspheric surface.

5. A zoom lens according to claim 1, satisfying the following conditions:

$$0.5<f_1/f_s<0.7$$

$$0.2<-f_2/f_s<0.4$$

$$0.4<f_3/f_s<1$$

where $f_1$: the focal length of said first lens unit;

$f_2$: the focal length of said second lens unit;

$f_3$: the focal length of said third lens unit; and $f_s$: the shortest focal length of the entire system.

6. A zoom lens according to claim 1, wherein said first lens unit comprises, in order from the large conjugate side, a negative meniscus lens convex toward the large conjugate side, at least one positive lens and a positive meniscus lens convex toward the large conjugate side.

7. A zoom lens according to claim 1, wherein said second lens unit comprises, in order from the large conjugate side, a negative meniscus lens convex toward the large conjugate side, a bi-concave lens and a positive lens having a strong power on the large conjugate side.

8. A zoom lens according to claim 1, wherein said third lens unit comprises, in order from the large conjugate side, a positive lens having a strong power on the large conjugate side, a negative meniscus lens convex toward the small conjugate side, a bi-concave lens having a strong power on the small conjugate side, a positive lens having a strong power on the small conjugate side and a bi-convex lens.

9. A zoom lens according to claim 6, wherein said positive meniscus lens in said first lens unit satisfies the following condition:

$$SF_{1r} < -3$$

where $SF_{1r} = (R_{1Grf} + R_{1Grr})/(R_{1Grf} - R_{1Grr})$ wherein $R_{1Grf}$: the radius of curvature of the large conjugate side of said positive meniscus lens in said first lens unit; and $R_{1Grr}$: the radius of curvature of the small conjugate side of said positive meniscus lens in said first lens unit.

10. A zoom lens according to claim 7, wherein said negative meniscus lens in said second lens unit satisfies the following condition:

$$1.5 < SF_{2f} < 4$$

where $SF_{2f} = (R_{2Gff} + R_{2Gfr})/(R_{2Gff} - R_{2Gfr})$ wherein $R_{2Gff}$: the radius of curvature of the large conjugate side of said negative meniscus lens in said second lens unit; and $R_{2Gfr}$: the radius of curvature of the small conjugate side of said negative meniscus lens in said second lens unit.

11. A zoom lens according to claim 8, further including at least one lens unit in rear of said third lens unit.

12. A zoom lens comprising, in order from a large conjugate side to a small conjugate side, a first lens unit of positive refractive power, a second lens unit of negative refractive power and another lens unit, zooming being performed by varying separations between said first lens unit and said second lens unit and between said second lens unit and said another lens unit, wherein said another lens unit includes a lens unit of positive refractive power on the small conjugate side, and wherein letting the focal length of said lens unit of positive refractive power in said another lens unit be denoted by $f_4$ and the shortest focal length of the entire system by $f_s$, the following conditions are satisfied:

$$1 < f_4/f_s < 3,$$

and $$0 \leq bf_s/f_s < 0.3$$

where $bf_s$ is the back focal distance obtained when a conjugate point on the large conjugate side lies at infinity.

13. A zoom lens according to claim 12, wherein said another lens unit includes a third lens unit of positive refractive power and a lens unit of positive refractive power arranged on the small conjugate side to be stationary, wherein when zooming from a shortest focal length end to a longest focal length end, the separation between said first and second lens units increases and the separation between said second and third lens units decreases.

14. A zoom lens comprising, in order from a large conjugate side to a small conjugate side, a first lens unit of positive refractive power, a second lens unit of negative refractive power and another lens unit, zooming being performed by varying separations between said first lens unit and said second lens unit and between said second lens unit and said another lens unit, wherein said another lens unit includes a lens unit of positive refractive power arranged on the small conjugate side to be stationary, and wherein letting the shortest focal length of the entire system be denoted by $f_s$, and the back focal distance obtained when a conjugate point on the large conjugate side lies at infinity by $bf_s$, the following condition is satisfied:

$$0 \leq bf_s/f_s < 0.3.$$

15. A zoom lens according to claim 14, further including a third lens unit arranged in between said second lens unit and said stationary lens unit on the small conjugate side, and wherein when zooming from a shortest focal length end to a longest focal length end, the separation between said first and second lens units increases and the separation between said second and third lens units decreases, and wherein the following condition is satisfied:

$$1 < f_4/f_s < 3$$

where $f_4$ is the focal length of said stationary lens unit on the small conjugate side.

16. A zoom lens according to claim 15, further satisfying the following condition:

$$0.15 < D_{23s}/D_{34s} < 0.6$$

where $D_{23s}$: the air separation for the shortest focal length end between said second and third lens units; and $D_{34s}$: the air separation for the shortest focal length end between said third lens unit and said stationary lens unit on the small conjugate side.

17. A zoom lens according to claim 15, further satisfying the following conditions:

$$0.5 < f_1/f_s < 1.5$$

$$0.2 < -f_2/f_s < 0.5$$

$$0.4 < f_3/f_s < 1.3$$

where $f_1$: the focal length of said first lens unit;

$f_2$: the focal length of said second lens unit; and $f_3$: the focal length of said third lens unit.

18. A zoom lens according to claim 15, further satisfying the following condition:

$$0.16 < N_{2p} - N_{2n} < 0.3$$

where $N_{2p}$: the mean value of refractive indices of positive lenses included in said second lens unit; and $N_{2n}$: the mean value of the refractive indices of the negative lenses included in said second lens unit.

19. A zoom lens according to claim 15, wherein said third lens unit comprises a front lens sub-unit of large conjugate side and a rear lens sub-unit of small conjugate side, with a longest air separation in said third lens unit intervening therebetween, and wherein the following condition is satisfied:

$$0.03 < D_{3ab}/f_3 < 0.2$$

where $D_{3ab}$: an air separation between said front lens sub-unit and said rear lens sub-unit; and $f_3$: the focal length of said third lens unit.

20. A zoom lens according to claim 15, wherein said second lens unit comprises, in order from the large conjugate side, a negative lens having a strong power on the small conjugate side, a cemented negative lens with a cemented surface thereof convex toward the large conjugate side and a positive lens having a strong power on the large conjugate side.

21. A zoom lens according to claim 15, further including a fixed stop arranged in between said third and fourth lens units to be stationary relative to a conjugate point on the small conjugate side.

22. A zoom lens according to claim 15, wherein said fourth lens unit is constructed from one positive single lens and satisfies the following condition:

$$-3.1 < SF_4 < -0.3$$

where $SF_4 = (r_{4f} + r_{4r})/(r_{4f} - r_{4r})$ wherein $r_{4f}$: the radius of curvature of the large conjugate side of said positive single lens of said fourth lens unit; and $r_{4r}$: the radius of curvature of the small conjugate side of said positive single lens of said fourth lens unit.

23. A zoom lens comprising, in order from a large conjugate side to a small conjugate side, a first lens unit of positive refractive power, a second lens unit of negative refractive power, a third lens unit of positive refractive power and a fourth lens unit of positive refractive power, wherein said lens units axially move in such relation that, when zooming from a shortest focal length end to a longest focal length end, an air separation between said first and second lens units increases and an air separation between said second and third lens units decreases, and wherein an air separation between said third lens unit and said fourth lens unit changes with zooming, and wherein the following condition is satisfied:

$$0.15 < D_{23s}/D_{34s} < 0.6$$

where $D_{23s}$: the air separation for the shortest focal length end between said second and third lens units; and $D_{34s}$: the air separation for the shortest focal length end between said third and fourth lens units.

24. A zoom lens according to claim 23, further satisfying the following conditions:

$$0.5 < f_1/f_s < 1.5$$

$$0.2 < -f_2/f_s < 0.5$$

$$0.4 < f_3/f_s < 1.3$$

where $f_1$: the focal length of said first lens unit;

$f_2$: the focal length of said second lens unit;

$f_3$: the focal length of said third lens unit; and $f_s$: the shortest focal length of the entire system.

25. A zoom lens according to claim 24, further satisfying the following condition:

$$0.16 < N_{2p} - N_{2n} < 0.3$$

where $N_{2p}$: the mean value of refractive indices of positive lenses included in said second lens unit; and $N_{2n}$: the mean value of refractive indices of negative lenses included in said second lens unit.

26. A zoom lens according to claim 23, wherein said third lens unit comprises a front lens sub-unit of large conjugate side and a rear lens sub-unit of small conjugate side with a longest air separation in said third lens unit intervening therebetween, and satisfies the following condition:

$$0.03 < D_{3ab}/f_3 < 0.2$$

where $D_{3ab}$: the air separation between said front lens sub-unit and said rear lens sub-unit; and $f_3$: the focal length of said third lens unit.

27. A zoom lens according to claim 23, wherein said second lens unit comprises, in order from the large conjugate side, a negative lens having a strong power on the small conjugate side, a cemented negative lens with a cemented surface thereof convex toward the large conjugate side and a positive lens having a strong power on the large conjugate side.

28. A zoom lens according to claim 23, further including a fixed stop arranged in between said third and fourth lens units to be stationary relative to a conjugate point on the small conjugate side.

29. A zoom lens according to claim 24, wherein said fourth lens unit is constructed from one positive single lens and satisfies the following condition:

$$-3.1 < SF_4 < -0.3$$

where $SF_4 = (r_{4f} + r_{4r})/(r_{4f} - r_{4r})$ wherein $r_{4f}$: the radius of curvature of the large conjugate side of said positive single lens of said fourth lens unit; and $r_{4r}$: the radius of curvature of the small conjugate side of said positive single lens of said fourth lens unit.

* * * * *